US012388477B2

(12) United States Patent
Oishi

(10) Patent No.: US 12,388,477 B2
(45) Date of Patent: Aug. 12, 2025

(54) SIGNAL TRANSMISSION DEVICE, INDUSTRIAL APPARATUS AND VEHICLE

(71) Applicant: ROHM CO., LTD., Kyoto (JP)

(72) Inventor: Yuki Oishi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 18/529,339

(22) Filed: Dec. 5, 2023

(65) Prior Publication Data

US 2024/0195442 A1 Jun. 13, 2024

(30) Foreign Application Priority Data

Dec. 12, 2022 (JP) ................................ 2022-197803

(51) Int. Cl.
*H04B 1/04* (2006.01)

(52) U.S. Cl.
CPC .................................... *H04B 1/04* (2013.01)

(58) Field of Classification Search
CPC ......... H01L 21/48; H01L 23/64; H01L 25/04; H01L 25/18; H01L 27/06; H02M 1/08; H02M 3/28; H02M 3/158; H02M 3/335; H04B 1/04; H04B 1/16; H04B 1/40; H04B 10/80; H04B 1/0483; H04B 3/00
USPC .................. 327/103, 536; 363/21.01, 21.12; 375/219, 258, 295, 316
See application file for complete search history.

(56) References Cited

U.S. PATENT DOCUMENTS

| | | | | |
|---|---|---|---|---|
| 2010/0052826 A1* | 3/2010 | Callahan | H01L 23/66 | 333/24 R |
| 2015/0171901 A1* | 6/2015 | Dupuis | H04B 10/802 | 375/295 |

FOREIGN PATENT DOCUMENTS

| | | |
|---|---|---|
| JP | 2017-188903 | 10/2017 |

* cited by examiner

*Primary Examiner* — Shawkat M Ali
(74) *Attorney, Agent, or Firm* — Fish & Richardson P.C.

(57) ABSTRACT

The present disclosure provides a signal transmission device. The signal transmission device includes a transmitting circuit, a plurality of insulated transmission paths and a receiving circuit. The transmitting circuit is configured to generate a plurality of mixed data strings from a plurality of input data strings. The plurality of insulated transmission paths are configured for insulation transmission of the plurality of mixed data strings. The receiving circuit is configured to restore a plurality of output data strings corresponding to the plurality of input data strings from the plurality of mixed data strings that are insulated and transmitted via the plurality of insulated transmission paths.

10 Claims, 15 Drawing Sheets

Receiving
circuit

5

SIGNAL TRANSMISSION DEVICE, INDUSTRIAL APPARATUS AND VEHICLE

TECHNICAL FIELD

The present disclosure relates to a signal transmission device, and an industrial apparatus and a vehicle using the same.

BACKGROUND

Conventionally, a signal transmission device that insulates between an input and an output and transmits signals is used in various application processes (power supply devices or motor drive devices).

Moreover, an example in the related prior art may be referred from patent publication 1.

PRIOR ART DOCUMENT

Patent Publication

[Patent document 1] Japan Patent Publication No. 2017-188903

DETAILED DESCRIPTION OF THE EMBODIMENTS

<Signal Transmission Device (Fundamental Configuration)>

Figure 1:
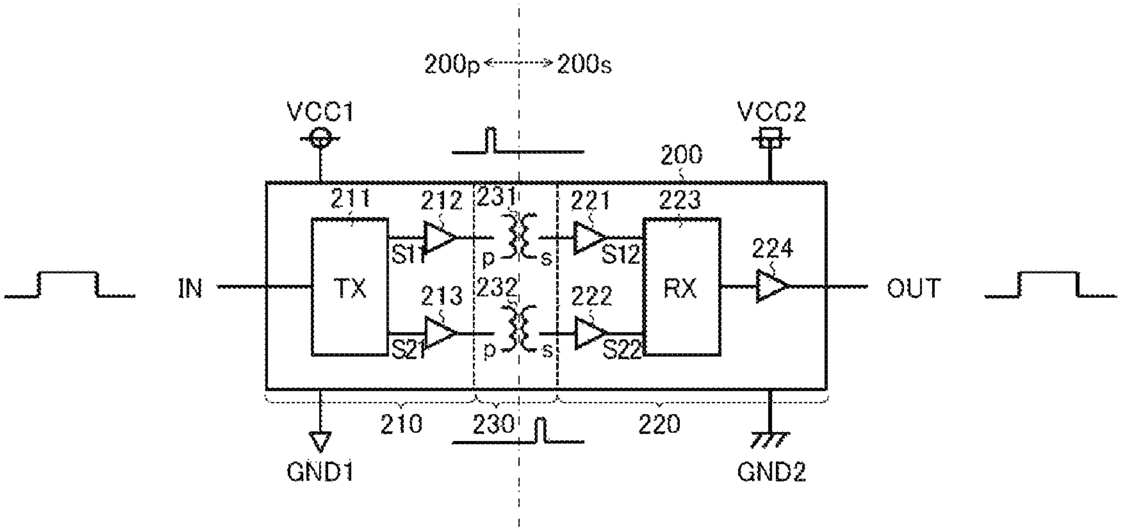
FIG. 1 is a diagram of a fundamental configuration of a signal transmission device.

FIG. 1 shows a diagram of a fundamental configuration of a signal transmission device. The signal transmission device 200 of this configuration example is a semiconductor integrated circuit device (a so-called gate-insulated driver IC) which insulates between a primary circuit system 200*p* (a VCC1-GND1 system) and a secondary circuit system 200*s* (a VCC2-GND2 system), transmits pulse signals from the primary circuit system 200*p* to the secondary circuit system 200*s*, and drives a gate of a switching element (not shown) disposed at the secondary circuit system 200*s*. For example, the signal transmission device 200 seals a controller chip 210, a driver chip 220 and a transformer chip 230 in one single package.

The controller chip 210 is a semiconductor chip which receives a supply of a power supply voltage VCC1 (for example, using GND1 as a reference and being 7 V in maximum) and operates accordingly. For example, a pulse transmitting circuit 211 and buffers 212 and 213 are integrated in the controller chip 210.

The pulse transmitting circuit 211 is a pulse generator which generates transmission pulse signals S11 and S21 according to an input pulse signal IN. More specifically, the pulse transmitting circuit 211 performs pulse driving (an output of single or multiple transmitting pulses) of the transmission pulse signal S11 when notified of a subject that the input pulse signal IN is at a high level, and performs pulse driving of the transmission pulse signal S21 when notified of a subject that the input pulse signal IN is at a low level. That is to say, the pulse transmitting circuit 211 performs pulse driving on either of the transmission pulse signals S11 and S21 according to a logic level of the input pulse signal IN.

The buffer 212 receives the input of the transmission pulse signal S11 from the pulse transmitting circuit 211, and performs pulse driving on the transformer chip 230 (more specifically, a transformer 231).

The buffer 213 receives the input of the transmission pulse signal S21 from the pulse transmitting circuit 211, and performs pulse driving on the transformer chip 230 (more specifically, a transformer 232).

The driver chip 220 is a semiconductor chip which receives a supply of a power supply voltage VCC2 (for example, using GND2 as a reference and being 30 V in maximum) and operates accordingly. For example, buffers 221 and 222, a pulse receiving circuit 223 and a driver 224 are integrated in the driver chip 220.

The buffer 221 performs waveform shaping on and outputs a sensed receiving pulse signal S12 in the transformer chip 230 (more specifically, the transformer 231) to the pulse receiving circuit 223.

The buffer 222 performs waveform shaping on and outputs a sensed receiving pulse signal S22 in the transformer chip 230 (more specifically, the transformer 232) to the pulse receiving circuit 223.

The pulse receiving circuit 223 drives the driver 224 according to reception pulse signals S12 and S22 input by the buffers 221 and 222 and generates an output pulse signal OUT. More specifically, the pulse receiving circuit 223 drives the driver 224 by receiving the pulse driving of the reception pulse signal S12 to increase the output pulse signal OUT to a high level, while receiving the pulse driving of the reception pulse signal S22 to decrease the output pulse signal OUT to a low level. That is to say, the pulse receiving circuit 223 switches the logic level of the output pulse signal OUT according to the logic level of the input pulse signal IN. Moreover, an RS trigger can be appropriately used as the pulse receiving circuit 223.

The driver 224 generates the output pulse signal OUT based on the driving control of the pulse receiving circuit 223.

The transformer chip 230 uses the transformers 231 and 232 as a DC insulation between the controller chip 210 and the driver chip 220, and outputs the transmission pulse signals S11 and S21 input from the pulse transmitting circuit 211 as the reception pulse signals S12 and S22 to the pulse receiving circuit 223. Moreover, in the present application, the term "DC insulation" mean that targets to be insulated are not connected by a conductor.

More specifically, the transformer 231 outputs the reception pulse signal S12 from a secondary-side coil 231*s* according to the transmission pulse signal S11 input to a primary-side coil 231*p*. On the other hand, the transformer 232 outputs the reception pulse signal S22 from a secondary-side coil 232*s* according to the transmission pulse signal S21 input to a primary-side coil 232*p*.

As such, in characteristics of a spiral coil used for insulation intercommunication, the input pulse signal IN is separated into the two transmission pulse signals S11 and S21 (equivalent to an amplified signal and an attenuated signal), and then transmitted from the primary circuit system 200*p* to the secondary circuit system 200*s* through two transformers 231 and 232.

Moreover, in addition to the controller chip 210 and the driver chip 220, the signal transmission device 200 of this configuration example further includes the separate transformer 230 mounted with only the transformers 231 and 232, and is formed in one single package by sealing these three chips.

With the configuration above, since the controller chip 210 and the driver chip 220 can be formed by a common low withstand voltage to a medium withstand voltage (a withstand voltage of several V to tens of V) processes, manufacturing costs can be reduced without use of specified high withstand voltage technique (a withstand voltage of several kV).

Moreover, for example, the signal transmission device 200 can be appropriately used for power supply devices or motor drive devices mounted on vehicles. In addition to an engine, the vehicle further includes an xEV such as a battery electric vehicle (BEV), a hybrid electric vehicle (HEV), a plug-in hybrid electric vehicle/plug-in hybrid vehicle (PHEV/PHV), or a fuel cell electric vehicle/fuel cell vehicle (FCEV/FCV).

<Transformer Chip (Fundamental Structure)>

Figure 2:
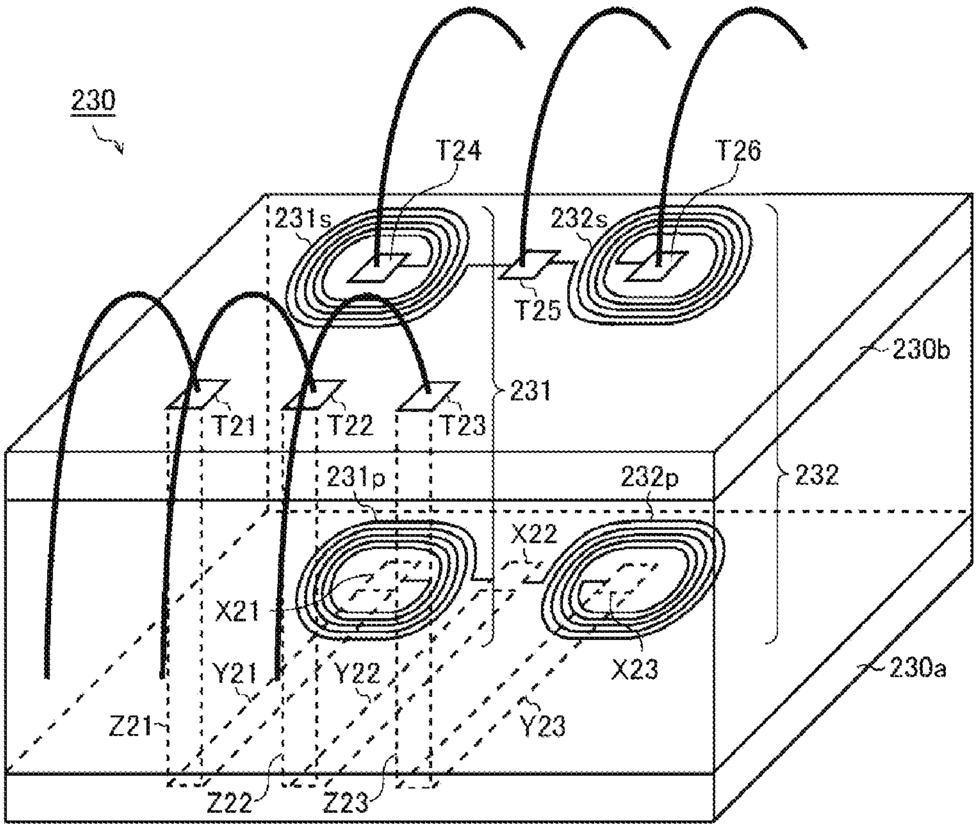
FIG. 2 is a diagram of a fundamental structure of a transformer chip.

Next, the fundamental structure of the transformer chip 230 is described below. FIG. 2 shows a diagram of a fundamental structure of the transformer chip 230. In the transformer chip 230 of the drawing, the transformer 231 includes a primary-side coil 231*p* and a secondary-side coil 231*s* facing each other in a top-down direction. The transformer 232 includes a primary-side coil 232*p* and a secondary-side coil 232*s* facing each other in a top-down direction.

Both of the primary-side coils 231*p* and 232*p* are formed in a first wiring layer (a lower layer) 230*a* of the transformer chip 230. Both of the secondary-side coils 231*s* and 232*s* are formed in a second wiring layer (an upper layer in the drawing) 230*b* of the transformer chip 230. Moreover, the secondary-side coil 231*s* is disposed directly above the primary-side coil 231*p*, and faces the primary-side coil 231*p*. In addition, the secondary-side coil 232*s* is disposed directly above the primary-side coil 232*p*, and faces the primary-side coil 232*p*.

The primary-side coil 231*p* is laid out in a spiral shape starting from a first end connected to an internal terminal X21 so as to surround the internal terminal X21 clockwise, and a second end equivalent to an end is connected to an internal terminal X22. On the other hand, the primary-side coil 232*p* is laid out in a spiral shape starting from a first end connected to an internal terminal X23 so as to surround the internal terminal X23 counterclockwise, and a second end equivalent to an end is connected to the internal terminal X22. The internal terminals X21, X22 and X23 are linearly arranged according to an order shown in the drawing.

The internal terminal X21 is connected to an external terminal T21 of the second layer 230*b* via a conductive wiring Y21 and a path Z21. The internal terminal X22 is connected to an external terminal T22 of the second layer 230*b* via a conductive wiring Y22 and a path Z22. The internal terminal X23 is connected to an external terminal T23 of the second layer 230*b* via a conductive wiring Y23 and a path Z23. Moreover, the external terminals T21 to T23 are linearly arranged and are configured to bond with conductive wires of the controller chip 210.

The secondary-side coil 231*s* is laid out in a spiral shape starting from a first end connected to an external terminal T24 so as to surround the external terminal T24 counterclockwise, and a second end equivalent to an end is connected to an external terminal T25. On the other hand, the secondary-side coil 232*s* is laid out in a spiral shape starting from a first end connected to an external terminal T26 so as to surround the external terminal T26 clockwise, and a second end equivalent to an end is connected to the external terminal T25. Moreover, the external terminals T24, T25 and T26 are linearly arranged in an order shown in the drawing, and are configured to bond with conductive wires of the driver chip 220.

The secondary-side coils 231*s* and 232*s* are respectively alternating-current (AC) connected the primary-side coils 231*p* and 232*p* by magnetic coupling, and are DC insulated from the primary-side coils 231*p* and 232*p*. That is to say, the driver chip 220 is AC connected to the controller chip 210 via the transformer chip 230, and is DC insulated from the controller chip 210 via the transformer chip 230.

<Transformer Chip (Two-Channel Type)>

Figure 3:
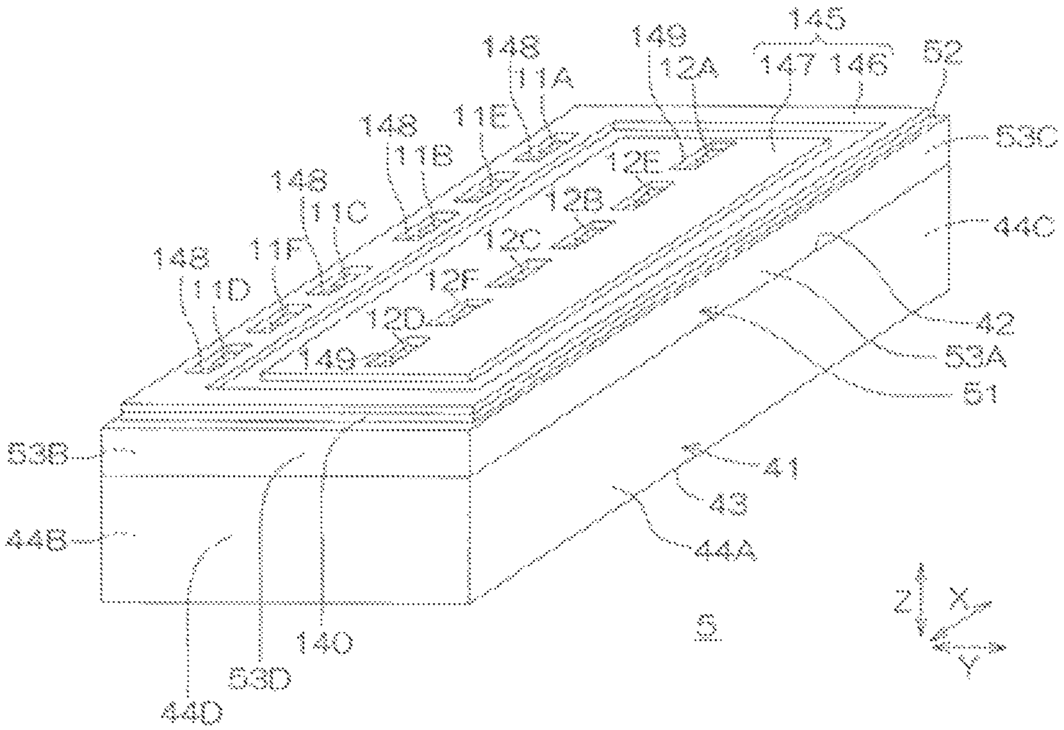
FIG. 3 is a perspective diagram of a semiconductor device used as a two-channel transformer chip.
Figure 4:
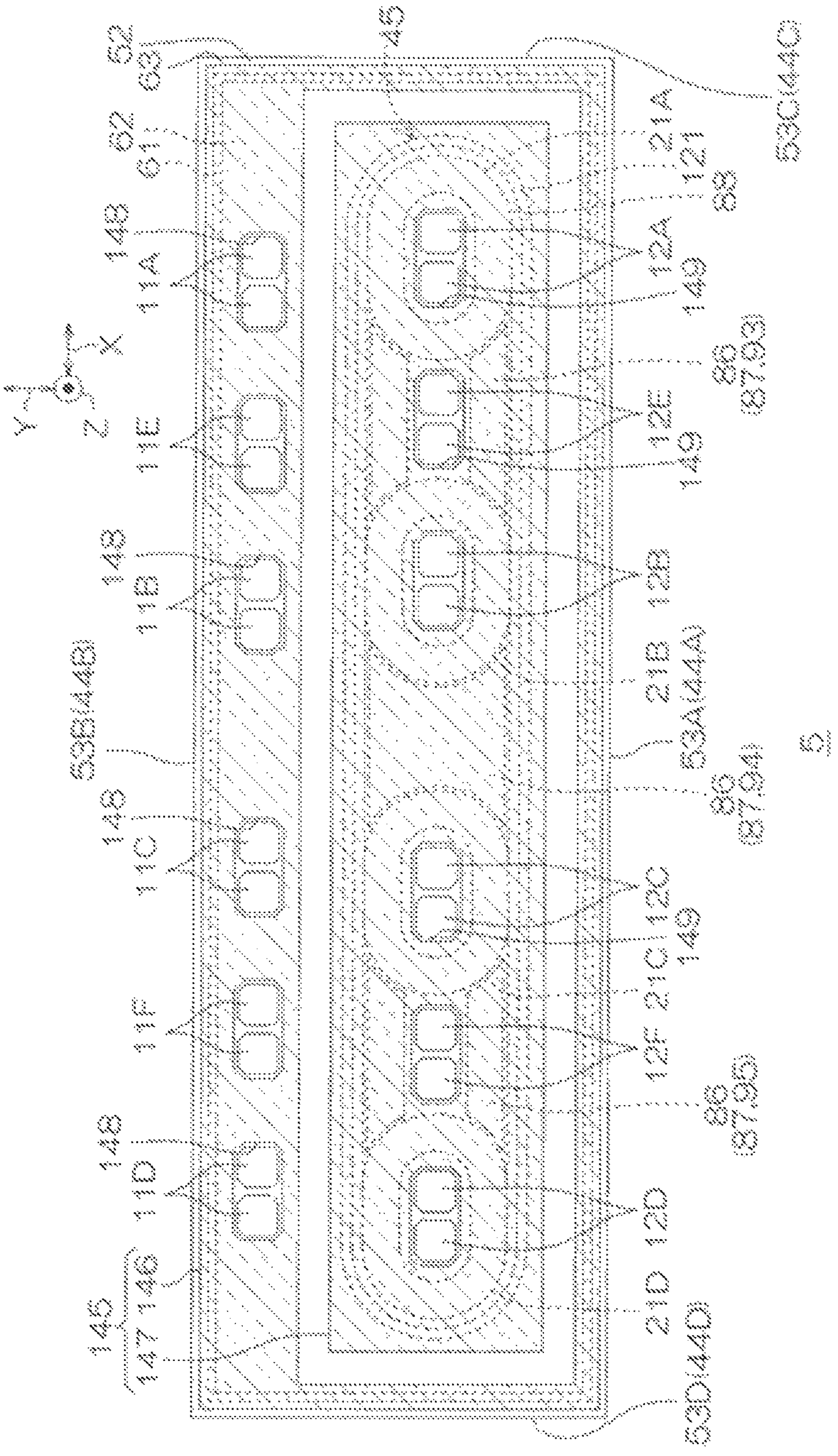
FIG. 4 is a plan view of the semiconductor device in FIG. 3.
Figure 5:
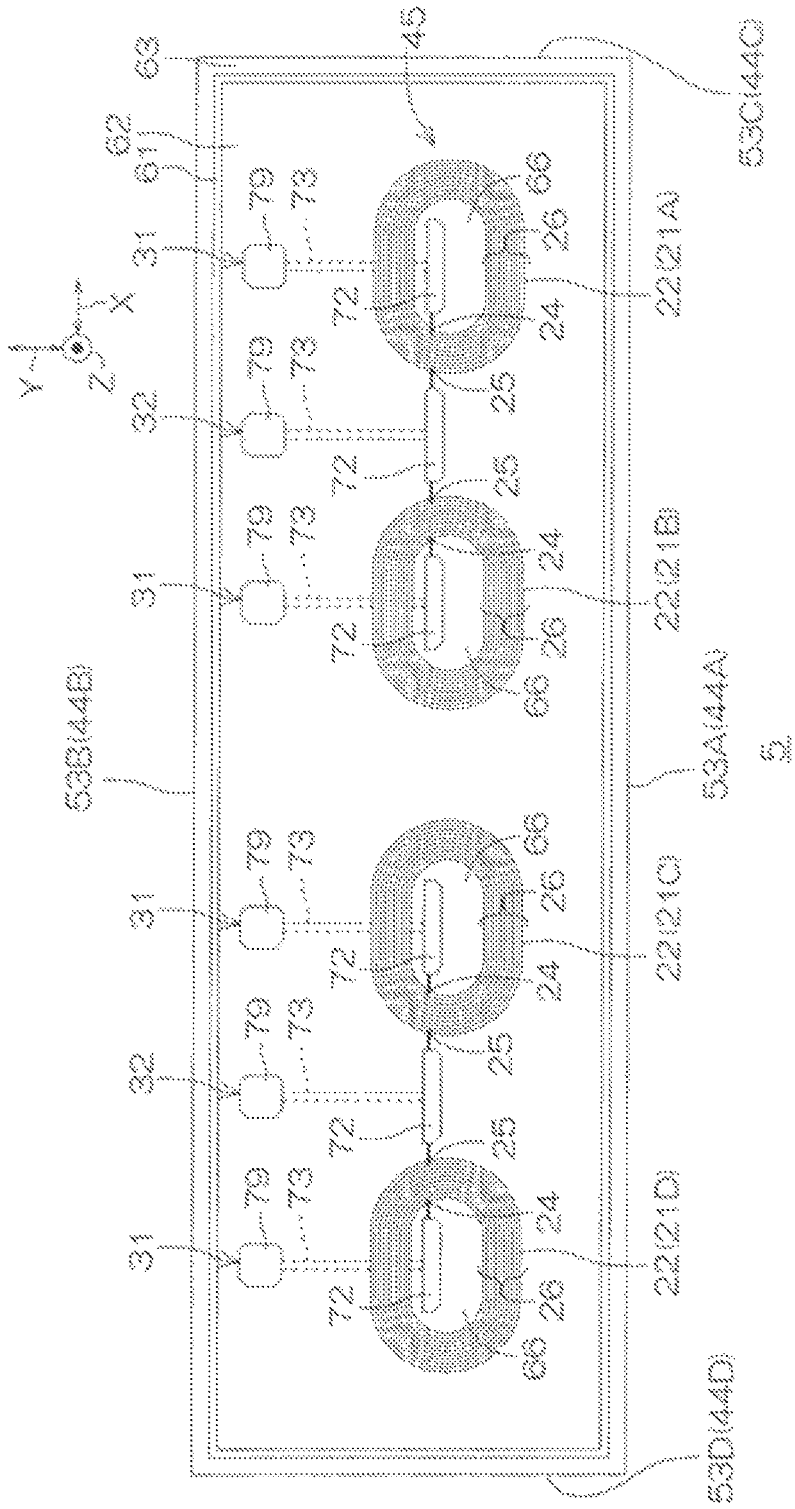
FIG. 5 is a plan view of a layer in which is a low potential coil is formed in the semiconductor device in FIG. 3.
Figure 6:
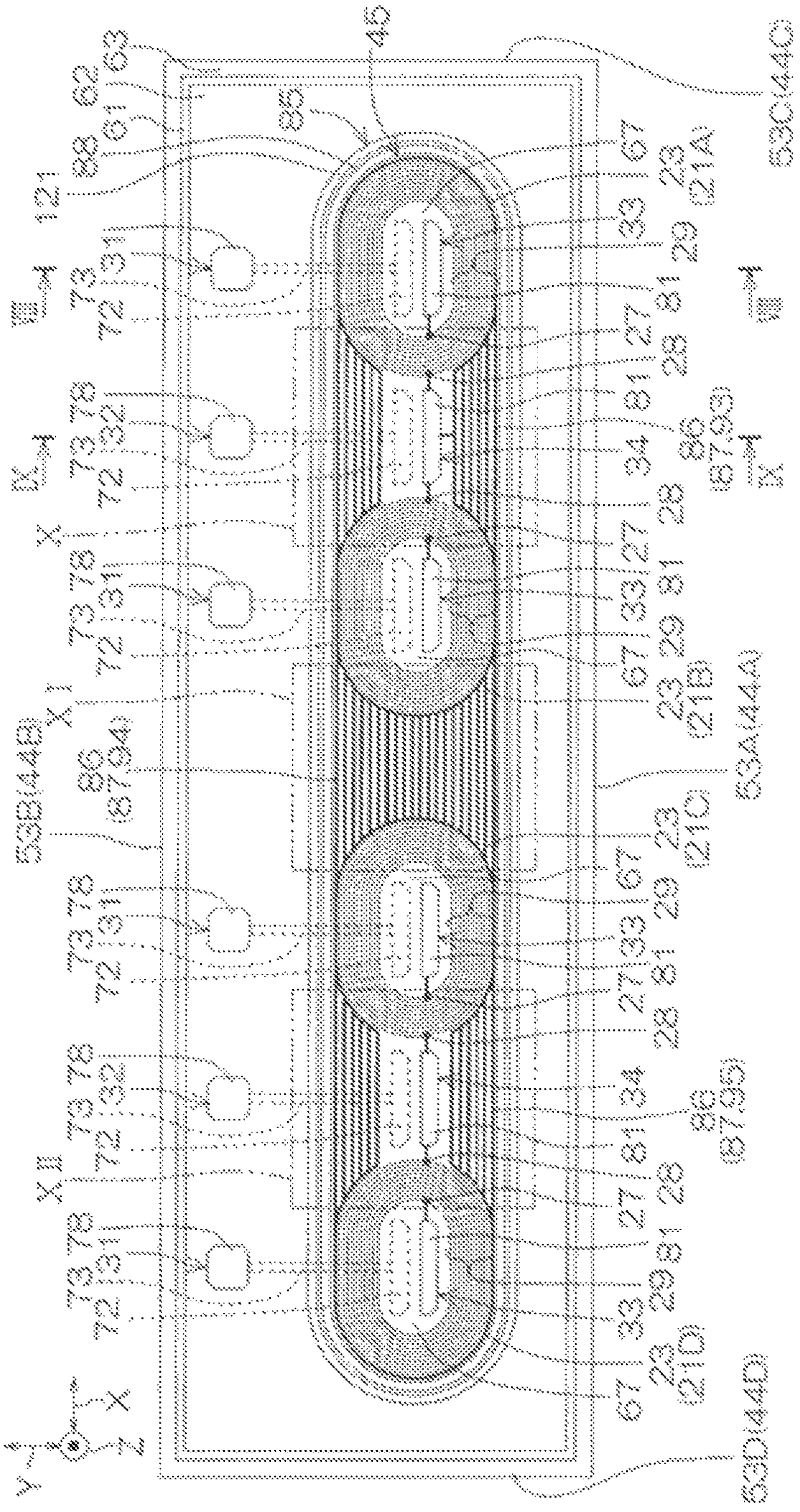
FIG. 6 is a plan view of a layer in which is a high potential coil is formed in the semiconductor device in FIG. 3.
Figure 7:
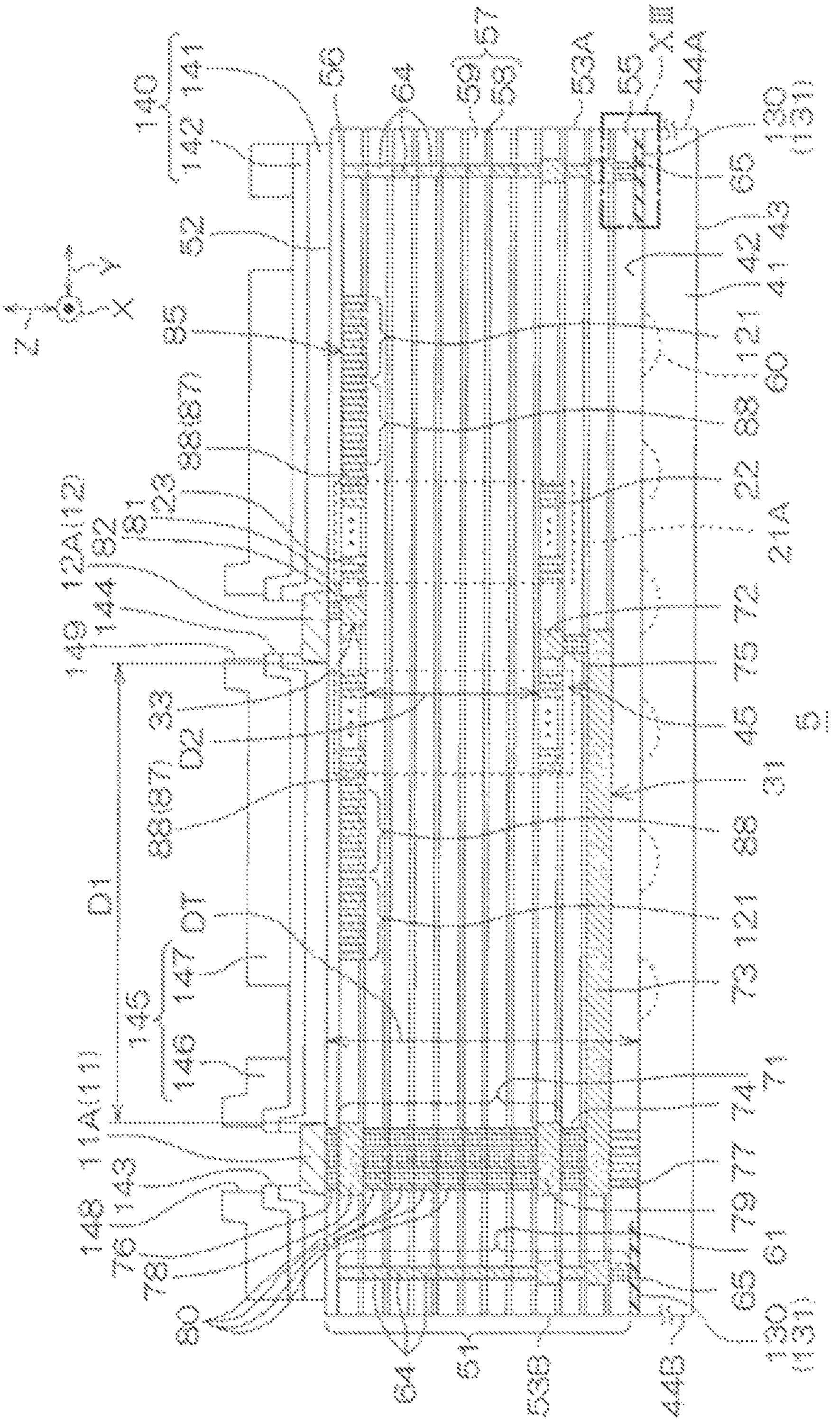
FIG. 7 is a section diagram along a section line VIII-VIII in FIG. 6.
Figure 8:
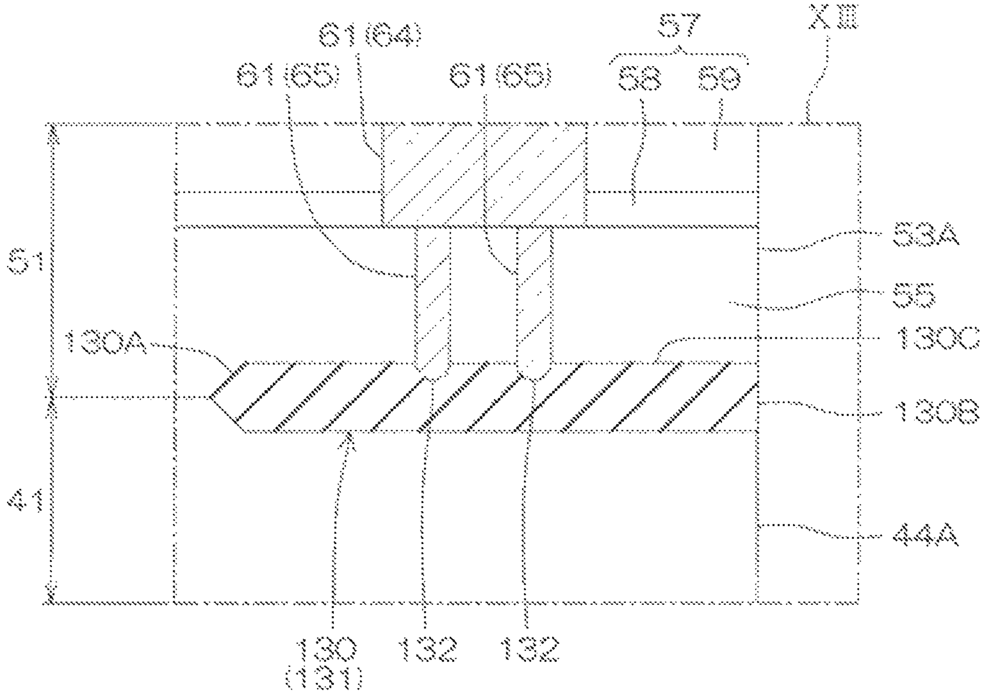
FIG. 8 is an enlarged diagram (a separation structure) of a region XIII shown in FIG. 7.

FIG. 3 shows a perspective diagram of a semiconductor device 5 used as a two-channel transformer chip. FIG. 4 shows a plan view of the semiconductor device 5 in FIG. 3. FIG. 5 shows a plan view of a layer in which a low potential coil 22 (equivalent to a primary-side coil of a transformer) is formed in the semiconductor device 5 in FIG. 3. FIG. 6 shows a plan view of a layer in which a high potential coil 23 (equivalent to a secondary-side coil of a transformer) is formed in the semiconductor device 5 in FIG. 3. FIG. 7 shows a section diagram along a section line VIII-VIII in FIG. 6. FIG. 8 shows an enlarged diagram of a region XIII shown in FIG. 7 and represents a diagram of a separation structure 130.

Referring to FIG. 3 to FIG. 7, the semiconductor device 5 includes a semiconductor chip 41 formed to have a rectangular shape. The semiconductor chip 41 includes at least one of silicon, a wide bandgap semiconductor and a compound semiconductor.

The wide bandgap semiconductor includes a semiconductor having a bandgap greater than that of silicon (about 1.12 eV). The bandgap of the wide bandgap semiconductor is preferably 2.0 eV or more. The wide bandgap semiconductor can be silicon carbide (SiC). The compound semiconductor can be a III-V group compound semiconductor. The compound semiconductor can include at least one of aluminum nitride (AlN), indium nitride (InN), gallium nitride (GaN), and gallium arsenide (GaAs).

The semiconductor chip 41 includes a semiconductor substrate formed of silicon in this implementation. The semiconductor chip 41 can also be an epitaxial substrate having a laminated structure including a silicon semiconductor substrate and a silicon epitaxial layer. A conductivity type of the semiconductor substrate can be n type or p type. The epitaxial layer can be n type or p type.

The semiconductor chip 41 includes a first main surface 43 on one side, a second main surface 44 on the other side, and four chip sidewalls 44A to 44D connecting the first main surface 42 and the second main surface 43. The first main surface 42 and the second main surface 43 are formed to have quadrilateral shapes (specifically rectangular shapes in this implementation) in a plan view when viewing from a normal direction Z thereof (to be referred to as "in the plan view" below).

The chip sidewalls 44A to 44D include a first chip sidewall 44A, a second chip sidewall 44B, a third chip sidewall 44C and a fourth chip sidewall 44D. The first chip sidewall 44A and the second chip sidewall 44B form long sides of the semiconductor chip 41. The first chip sidewall 44A and the second chip sidewall 44B extend in a first direction X and are opposite in a second direction Y. The third chip sidewall 44C and the fourth chip sidewall 44D form short sides of the semiconductor chip 41. The third chip sidewall 44C and the fourth chip sidewall 44D extend in the second direction Y and are opposite in the first direction X. The chip sidewalls 44A and 44D include grinding surfaces.

The semiconductor device 5 further includes an insulating layer 51 formed on the first main surface 42 of the semiconductor chip 41. The insulating layer 51 has an insulating main surface 52 and insulating sidewalls 53A to 53D. The insulating main surface 52 is formed to have a quadrilateral shape (a rectangular shape in this implementation) matching the first main surface 42. The insulating main surface 52 extends in parallel with respect to the first main surface 42.

The insulating sidewalls 53A to 53D include a first insulating sidewall 53A, a second insulating sidewall 53B, a third insulating sidewall 53C and a fourth insulating sidewall 53D. The insulating sidewalls 53A to 53D extend from a periphery of the insulating main surface 52 toward the semiconductor chip 41, and are connected to the chip sidewalls 44A to 44D. More specifically, the insulating sidewalls 53A o 53D are formed as leveled surfaces with respect to the chip sidewalls 44A to 44D. The insulating sidewalls 53A to 53D are formed as leveled grinding surfaces with respect to the chip sidewalls 44A to 44D.

The insulating layer 51 is formed by a laminated structure including a lowermost insulating layer 55, an uppermost insulating layer 56 and multiple (11 in this embodiment) interlayer insulating layers 57. The lowermost insulating layer 55 is an insulating layer directly covering the first main surface 42. The uppermost insulating layer 56 is an insulating layer forming the insulating main surface 52. The multiple interlayer insulating layers 57 are insulating layers located between the lowermost insulating layer 55 and the uppermost insulating layer 56. The lowermost insulating layer 55 includes a single-layer structure containing SiO in this implementation. The uppermost insulating layer 56 includes a single-layer structure containing SiO in this implementation. Each of a thickness of the lowermost insulating layer 55 and a thickness of the uppermost insulating layer 56 can be between about 1 micrometer (μm) and about 3 μm (for example, approximately 2 μm).

Each of the multiple interlayer insulating layers 57 includes a laminated structure including a first insulating layer 58 on the side of the lowermost insulating layer 55 and a second insulating layer 59 on the side of the uppermost insulating layer 56. The first insulating layer 58 can include silicon nitride (SiN). The first insulating layer 58 is formed of an etch barrier layer for the second insulating layer 59. A thickness of the first insulating layer 58 can be between about 0.1 μm and about 1 μm (for example, approximately 0.3 μm).

The second insulating layer 59 is formed on the first insulating layer 58, and includes an insulating material different from that of the first insulating layer 58. The second insulating layer 59 can include SiO. A thickness of the second insulating layer 59 can be between about 1 μm and about 3 μm (for example, approximately 2 μm). The thickness of the second insulating layer 59 is preferably greater than the thickness of the first insulating layer 58.

A total thickness DT of the insulating layer 51 is between about 5 μm and about 50 μm. The total thickness DT of the insulating layer 51 and the number of the interlayer insulating layers 57 laminated can be any as desired, and are adjusted according to an insulation withstand voltage (an insulation breakdown voltage) to be implemented. Moreover, insulating materials of the lowermost insulating layer 55, the uppermost insulating layer 56 and the interlayer insulating layers 57 can be any as desired, and are not limited to specific insulating materials.

The semiconductor device 5 includes a first functional component 45 formed at the insulating layer 51. The first functional component 45 includes one or more (multiple in this implementation) transformers 21 (equivalent to the transformer above). That is to say, the semiconductor device 5 is a multi-channel component including multiple transformers 21. The multiple transformers 21 are formed at a distance from the insulating sidewalls 53A to 53D on an inside of the insulating layer 51. The multiple transformers 21 are formed at intervals in the first direction X.

More specifically, the multiple transformers 21 include a first transformer 21A, a second transformer 21B, a third transformer 21C and a fourth transformer 21D sequentially formed from the side of the insulating sidewall 53C toward the side of the insulating sidewall 53D in the plan view. Each of the multiple transformers 21A to 21D has a structure identical to that of another. The structure of the first transformer 21A is described as an example below. Details of the structure of the first transformer 21A are applicable to the structures of the second transformer 21B, the third transformer 21C and the fourth transformer 21D, and such repeated description is omitted herein.

Referring to FIG. 5 to FIG. 7 the first transformer 21A includes a low potential coil 22 and a high potential coil 23. The low potential coil 22 is formed in the insulating layer 51. The high potential coil 23 is formed in the insulating layer 51 to face the low potential coil 22 in the normal direction Z. The low potential coil 22 and the high potential coil 23 are in a region sandwiched by the lowermost insulating layer 55 and the uppermost insulating layer 56 in this implementation (that is, the multiple interlayer insulating layers 57).

The low potential coil 22 is formed on the side of the lowermost insulating layer 55 (the semiconductor chip 41)

in the insulating layer 51, and the high potential coil 23 is formed on the side of the uppermost insulating layer 56 with respect to the low potential coil 22 in the insulating layer 51. That is to say, the high potential coil 23 is separated by the low potential coil 22 to face the semiconductor chip 41. The low potential coil 22 and the high potential coil 23 can be arranged at any positions desired. Moreover, the high potential coil 23 is separately by one or more interlayer insulating layers 57 to face the low potential coil 22.

A distance between the low potential coil 22 and the high potential coil 23 (that is, the number of the interlayer insulating layers 57 laminated) is appropriately adjusted according to the insulation withstand voltage and an electric field strength between the low potential coil 22 and the high potential coil 23. In this implementation, the low potential coil 22 is formed at the third interlayer insulating layer 57 from the side of the lowermost insulating layer 55. In this implementation, the high potential coil 23 is formed at the first interlayer insulating layer 57 from the side of the uppermost insulating layer 56.

The low potential coil 22 is buried by passing through the first insulating layer 58 and the second insulating layer 59 in the interlayer insulating layers 57. The low potential coil 22 includes a first inner end 24, a first outer end 25, and a first spiral portion 26 wound spirally between the first inner end 24 and the first outer end 25. The first spiral portion 26 winds as a spiral extending in an ellipsoidal shape (a long circular shape). An innermost peripheral portion forming the first spiral portion 26 defines a first inner region 66 in an ellipsoidal shape in the plan view.

The number of windings of the first spiral portion 26 can be between 5 and 30. A width of the first spiral portion 26 can be between about 0.1 μm and about 5 μm. The width of the first spiral portion 26 is preferably between about 1 μm and about 3 μm. The width of the first spiral portion 26 is defined by a width in a direction perpendicular to the spiral direction. A first winding pitch of the first spiral portion 26 can be between about 0.1 μm and about 5 μm. The first winding pitch is preferably between about 1 μm and about 3 μm. The first winding pitch is defined by a distance between two adjacent portions of the first winding portion 26 in a direction perpendicular to the spiral direction.

A winding shape of the first spiral portion 26 and a planar shape of the first inner region 66 can be any as desired, and are not limited to the examples shown in the implementation in FIG. 5. The first spiral portion 26 can also be wound in a shape as a polygon such as a triangle or a quadrilateral or a circle in the plan view. The first inner region 66 can also be defined in a shape as a polygon such as a triangle or a quadrilateral or a circle in the plan view according to the winding shape of the first spiral portion 26.

The low potential coil 22 can include at least one of titanium (Ti), titanium nitride (TiN), copper (Cu), aluminum (Al) and tungsten (W). The low potential coil 22 can also have a laminated structure including a barrier layer and a body layer. The barrier layer defines a recess space in the interlayer insulating layer 57. The barrier layer can include at least one of Ti and TiN. The body layer can include at least one of Cu, Al and W.

The high potential coil 23 is buried by passing through the first insulating layer 58 and the second insulating layer 59 in the interlayer insulating layers 57. The high potential coil 23 includes a second inner end 27, a second outer end 28, and a second spiral portion 29 wound spirally between the second inner end 27 and the second outer end 28. The second spiral portion 29 winds as a spiral extending in an ellipsoidal shape (a long circular shape) in the plan view. In this implementation, an innermost peripheral portion forming the second spiral portion 29 defines a second inner region 67 in an ellipsoidal shape in the plan view. The second inner region 67 of the second spiral portion 29 faces the first inner region 66 of the first spiral portion 26 in the normal direction Z.

The number of windings of the second spiral portion 29 can be between 5 and 30. The number of windings of the second spiral portion 29 with respect to the number of windings of the first spiral portion 26 is adjusted according to a voltage value to be stepped up. The number of windings of the second spiral portion 29 is preferably greater than the number of windings of the first spiral portion 26. As a matter of course, the number of windings of the second spiral portion 29 can be less than the number of windings of the first spiral portion 26 or can be equal to the number of windings of the first spiral portion 26.

A width of the second spiral portion 29 can be between about 0.1 μm and about 5 μm. The width of the second spiral portion 29 is preferably between about 1 μm and about 3 μm. The width of the second spiral portion 29 is defined by a width in a direction perpendicular to the spiral direction. The width of the second spiral portion 29 is preferably equal to the width of the first spiral portion 26.

A second winding pitch of the second spiral portion 29 can be between about 0.1 μm and about 5 μm. The second winding pitch is preferably between about 1 μm and about 3 μm. The second winding pitch is defined by a distance between two adjacent portions of the second winding portion 29 in a direction perpendicular to the spiral direction. The second winding pitch is preferably equal to the first winding pitch of the first spiral portion 26.

A winding shape of the second spiral portion 29 and a planar shape of the second inner region 67 can be any as desired, and are not limited to the examples shown in the implementation in FIG. 6. The second spiral portion 29 can also be wound in a shape as a polygon such as a triangle or a quadrilateral or a circle in the plan view. The second inner region 67 can also be defined to have a shape as a polygon such as a triangle or a quadrilateral or a circle in the plan view according to the winding shape of the second spiral portion 29.

The high potential coil 23 is preferably formed of a same conductive material as the low potential coil 22. That is to say, the high potential coil 23 preferably includes a barrier layer and a body layer as the low potential coil 22.

Referring to FIG. 4, the semiconductor device 5 includes multiple (12 in this drawing) low potential terminals 11 and multiple (12 in this drawing) high potential terminals 12. The multiple low potential terminals 11 are electrically connected to the low potential coils 22 of the corresponding transformers 21A to 21D, respectively. The multiple high potential terminals 12 are electrically connected to the high potential coils 23 of the corresponding transformers 21A to 21D, respectively.

The multiple low potential terminals 11 are formed on the insulating main surface 52 of the insulating layer 51. More specifically, the multiple low potential terminals 11 are formed at a distance from the multiple transformers 21A to 21D in the second direction Y in a region on the side of the insulating sidewall 53B, and are arranged at intervals in the first direction X.

The multiple low potential terminals 11 include a first low potential terminal 11A, a second low potential terminal 11B, a third low potential terminal 11C, a fourth low potential terminal 11D, a fifth low potential terminal 11E and a sixth low potential terminal 11F. In this implementation, each of the low potential terminals 11A to 11F is formed as two in number. The number of the low potential terminals 11A to 11F can be any as desired.

The first low potential terminal 11A faces the first transformer 21A in the second direction Y in the plan view. The second low potential terminal 11B faces the second transformer 21B in the second direction Y in the plan view. The third low potential terminal 11C faces the third transformer 21C in the second direction Y in the plan view. The fourth low potential terminal 11D faces the fourth transformer 21D in the second direction Y in the plan view. The fifth low potential terminal 11E is formed in a region between the first low potential terminal 11A and the second low potential terminal 11B in the plan view. The sixth low potential terminal 11F is formed in a region between the third low potential terminal 11C and the fourth low potential terminal 11D in the plan view.

The first low potential terminal 11A is electrically connected to the first inner end 24 of the first transformer 21A (the low potential coil 22). The second low potential terminal 11B is electrically connected to the first inner end 24 of the second transformer 21B (the low potential coil 22). The third low potential terminal 11C is electrically connected to the first inner end 24 of the third transformer 21C (the low potential coil 22). The fourth low potential terminal 11D is electrically connected to the first inner end 24 of the fourth transformer 21D (the low potential coil 22).

The fifth low potential terminal 11E is electrically connected to the first outer end 25 of the first transformer 21A (the low potential coil 22) and the first outer end 25 of the second transformer 21B (the low potential coil 22). The sixth low potential terminal 11F is electrically connected to the first outer end 25 of the third transformer 21C (the low potential coil 22) and the first outer end 25 of the fourth transformer 21D (the low potential coil 22).

The multiple high potential terminals 11 are formed at a distance from the multiple low potential terminals 11 on the insulating main surface 52 of the insulating layer 51. More specifically, the multiple high potential terminals 12 are formed at a distance from the multiple low potential terminals 11 in the second direction Y in a region on the side of the insulating sidewall 53A, and are arranged at intervals in the first direction X.

The multiple high potential terminals 12 are formed in regions close to the corresponding transformers 21A to 21D in the plan view, respectively. The high potential terminals 12 being close to the transformers 21A to 21D mean that, a distance between the high potential terminals 21 and the transformers 21 is less than a distance between the low potential terminals 11 and the high potential terminals 12 in the plan view.

More specifically, the multiple high potential terminals 12 are formed at intervals in the first direction X to face the multiple transformers 21A to 21D in the first direction X in the plan view. More specifically, the multiple high potential terminals 12 are formed at intervals in the first direction X in a region located between the second inner region 67 of the high potential coils 23 and the adjacent high potential coils 23 in the plan view. Accordingly, the multiple high potential terminals 12 are formed in one row with the multiple transformers 21A to 21D in the first direction X in the plan view.

The multiple high potential terminals 12 include a first high potential terminal 12A, a second high potential terminal 12B, a third high potential terminal 12C, a fourth high potential terminal 12D, a fifth high potential terminal 12E and a sixth high potential terminal 12F. In this implementation, each of the high potential terminals 12A to 12F is formed as two in number. The number of the high potential terminals 12A to 12F can be any as desired.

The first high potential terminal 12A is formed in the second inner region 67 of the first transformer 21A (the high potential coil 23) in the plan view. The second high potential terminal 12B is formed in the second inner region 67 of the second transformer 21B (the high potential coil 23) in the plan view. The third high potential terminal 12C is formed in the second inner region 67 of the third transformer 21C (the high potential coil 23) in the plan view. The fourth high potential terminal 12D is formed in the second inner region 67 of the fourth transformer 21D (the high potential coil 23) in the plan view. The fifth high potential terminal 12E is formed in a region between the first transformer 21A and the second transformer 21B in the plan view. The sixth high potential terminal 12F is formed in a region between the third transformer 21C and the fourth transformer 21D in the plan view.

The first high potential terminal 12A is electrically connected to the second inner end 27 of the first transformer 21A (the high potential coil 23). The second high potential terminal 12B is electrically connected to the second inner end 27 of the second transformer 21B (the high potential coil 23). The third high potential terminal 12C is electrically connected to the second inner end 27 of the third transformer 21C (the high potential coil 23). The fourth high potential terminal 12D is electrically connected to the second inner end 27 of the fourth transformer 21D (the high potential coil 23).

The fifth high potential terminal 12E is electrically connected to the second outer end 28 of the first transformer 21A (the high potential coil 23) and the second outer end 28 of the second transformer 21B (the high potential coil 23). The sixth high potential terminal 12F is electrically connected to the second outer end 28 of the third transformer 21C (the high potential coil 23) and the second outer end 28 of the fourth transformer 21D (the high potential coil 23).

Referring to FIG. 5 to FIG. 7, the semiconductor device 5 includes a first low potential wiring 31, a second low potential wiring 32, a first high potential wiring 33 and a second high potential wiring 34 individually formed in the first insulating layer 51. In this implementation, a plurality of first low potential wirings 31, a plurality of second low potential wirings 32, a plurality of first high potential wirings 33 and a plurality of second high potential wirings 34 are formed.

The first low potential wiring 31 and the second low potential wiring 32 fix the low potential coil 22 of the first transformer 21A and the low potential coil 22 of the second transformer 21B to the same potential. Moreover, the first low potential wiring 31 and the second low potential wiring 32 fix the low potential coil 22 of the third transformer 21C and the low potential coil 22 of the fourth transformer 21D to the same potential. In this implementation, the first low potential wiring 31 and the second low potential wiring 32 fix all of the low potential coils 22 of the transformers 21A to 21D to the same potential.

The first high potential wiring 33 and the second high potential wiring 34 fix the high potential coil 23 of the first transformer 21A and the high potential coil 23 of the second transformer 21B to the same potential. Moreover, the first high potential wiring 33 and the second high potential wiring 34 fix the high potential coil 23 of the third transformer 21C and the high potential coil 23 of the fourth transformer 21D to the same potential. In this implementation, the first high potential wiring 33 and the second high potential wiring 34 fix all of the high potential coils 23 of the transformers 21A to 21D to the same potential.

The plurality of first low potential wirings 31 are electrically connected to the corresponding low potential terminals 11A to 11D and the first inner ends 24 of the corresponding transformers 21A to 21D (the low potential coils 22), respectively. The plurality of first low potential wirings 31 have the same structure. The structure of the first low potential wiring 31 connected to the first low potential terminal 11A and the first transformer 21A is described as an example below. Details of the structure of the first low potential wiring 31 connected to the first transformer 21A are applicable to the structures of other first low potential wirings 31, and such repeated description is omitted herein.

The first low potential wiring 31 includes a through wiring 71, a low potential connection wiring 72, a lead-out wiring 73, a first connection plug electrode 74, a second connection plug electrode 75, one or more (multiple in this implementation) pad plug electrodes 76, and one or more (multiple in this implementation) substrate plug electrodes 77.

Each of the through wiring 71, the low potential connection wiring 72, the lead-out wiring 73, the first connection plug electrode 74, the second connection plug electrode 75, the pad plug electrode 76 and the substrate plug electrode 77 is preferably formed of the same conductive material as the low potential coil 22. That is to say, each of the through wiring 71, the low potential connection wiring 72, the lead-out wiring 73, the first connection plug electrode 74, the second connection plug electrode 75, the pad plug electrode 76 and the substrate plug electrode 77 preferably includes a barrier layer and a body layer, as the low potential coil 22.

The through wiring 71 passes through the plurality of interlayer insulating layers 57 in the insulating layer 51, and extends in a column shape along the normal direction Z. In this implementation, the through wiring 71 is formed in a region between the lowermost insulating layer 55 and the uppermost insulating layer 56 in the insulating layer 51. The through wiring 71 includes an upper end on the side of the uppermost insulating layer 56 and a lower end on the side of the lowermost insulating layer 55. The upper end of the through wiring 71 is formed in the same interlayer insulating layer 57 as the high potential coil 23, and is covered by the uppermost insulating layer 56. The upper end of the through wiring 71 is formed in the same interlayer insulating layer 57 as the low potential coil 22.

In this implementation, the through wiring 71 includes a first electrode layer 78, a second electrode layer 79 and a plurality of wiring plug electrodes 80. In the through wiring 71, each of the first electrode layer 78, the second electrode layer 79 and the wiring plug electrodes 80 is formed of the same conductive material as the low potential coil 22. That is to say, each of the first electrode layer 78, the second electrode layer 79 and the wiring plug electrodes 80 includes a barrier layer and a body layer, as the potential coil 22.

The first electrode layer 78 forms the upper end of the through wiring 71. The second electrode layer 79 forms the lower end of the through wiring 71. The first electrode layer 78 is formed to have a shape of an island, and faces the low potential terminal 11 (the first low potential terminal 11A) in the normal direction Z. The second electrode layer 79 is formed to have a shape of an island, and faces the first electrode layer 78 in the normal direction Z.

The plurality of wiring plug electrodes 78 are respectively buried in the plurality of interlayer insulating layers 57 in a region between the first electrode layer 78 and the second electrode layer 79. The plurality of wiring plug electrodes 80 are laminated from the lowermost insulating layer 55 toward the uppermost insulating layer 56 to be electrically connected to one another, and electrically connect the first electrode layer 78 and the second electrode layer 79. Each of the plurality of wiring plug electrodes 80 has a planar area less than a planar area of the first electrode layer 78 and a planar area of the second electrode layer 79.

Moreover, the number of the plurality of wiring plug electrodes 80 laminated is consistent with the number of the plurality of interlayer insulating layers 57 laminated. In this implementation, six wiring plug electrodes 80 are buried in the interlayer insulating layers 57; however, the number of the wiring plug electrodes 80 buried in the interlayer insulating layers 57 can be any number as desired. As a matter of course, one or more wiring plug electrodes 80 passing through the plurality of interlayer insulating layers 57 can also be formed.

The low potential connection wiring 72 is in the same interlayer insulating layer 57 as the low potential coil 22, and is formed in the first inner region 66 of the first transformer 21A (the low potential coil 22). The low potential connection wiring 72 is formed to have a shape of an island, and faces the high potential terminal 12 (the first high potential terminal 12A) in the normal direction Z. The low potential connection wiring 72 preferably has a planar area greater than the planar area of the wiring plug electrode 80. The low potential connection wiring 72 is electrically connected to the first inner end 24 of the low potential coil 22.

The lead-out wiring 73 is formed in a region between the semiconductor chip 41 and the through wiring 71 in the interlayer insulating layer 57. In this implementation, the lead-out wiring 73 is formed at the first interlayer insulating layer 57 from the lowermost insulating layer 55. The lead-out wiring 73 includes a first end on one side, a second end on the other side, and a wiring portion connecting the first end and the second unit. The first end of the lead-out wiring 73 is located in a region between the semiconductor chip 41 and the lower end of the through wiring 71. The second end of the lead-out wiring 73 is located in a region between the semiconductor chip 41 and the low potential connection wiring 72. The wiring portion extends along the first main surface 42 of the semiconductor chip 41, and extends as a strip in a region between the first end and the second end.

The first connection plug electrode 74 is formed in a region between the through wiring 71 and the lead-out wiring 73 in the interlayer insulating layers 57, and is electrically connected to the through wiring 71 and the first end of the lead-out wiring 73. The second connection plug electrode 75 is formed in a region between the low potential connection wiring 72 and the lead-out wiring 73 in the interlayer insulating layers 57, and is electrically connected to the low potential connection wiring 72 and the second end of the lead-out wiring 73.

The plurality of pad plug electrodes 76 are formed in a region between the low potential terminal 11 (the first low potential terminal 11A) and the through wiring 71 in the uppermost insulating layer 56, and are individually electrically connected to the low potential terminal 11 and the upper end of the through wiring 71. The plurality of substrate plug electrodes 77 are formed in a region between the semiconductor chip 41 and the lead-out wiring 73 in the lowermost insulating layer 55. In this implementation, the substrate plug electrodes 77 are formed in a region between the semiconductor chip 41 and the first end of the lead-out wiring 73, and are individually electrically connected to the semiconductor chip 41 and the first end of the lead-out wiring 73.

Referring to FIG. 6 and FIG. 7, the plurality of first high potential wirings 33 are electrically connected to the corresponding high potential terminals 12A to 12D and the second inner ends 27 of the corresponding transformers 21A to 21D (the high potential coils 23), respectively. The plurality of first high potential wirings 33 have the same structure. The structure of the first high potential wiring 33 connected to the first high potential terminal 12A and the first transformer 21A is described as an example below. Details of the structure of the first high potential wiring 33 connected to the first transformer 21A are applicable to the structures of other first high potential wirings 33, and such repeated description is omitted herein.

The first high potential wiring 33 includes a high potential connection wiring 81, and one or more (multiple in this implementation) pad plug electrodes 82. The high potential connection wiring 81 and the pad plug electrode 82 are preferably formed of a same conductive material as the low potential coil 22. That is to say, each of the high potential connection wiring 81 and the pad plug electrode 82 preferably includes a barrier layer and a body layer, as the low potential coil 22.

The high potential connection wiring 81 is in the same interlayer insulating layer 57 as the high potential coil 23, and is formed in the second inner region 67 of the high potential coil 23. The high potential connection wiring 81 is formed to have a shape of an island, and faces the high potential terminal 12 (the first high potential terminal 12A) in the normal direction Z. The high potential connection wiring 81 is electrically connected to the second inner end 27 of the high potential coil 23. The high potential connection wiring 81 is formed at a distance from the low potential connection wiring 72 in the plan view, and does not face the low potential connection wiring 72 in the normal direction Z. Accordingly, an insulation distance between the low potential connection wiring 72 and the high potential connection wiring 81 is increased, and so the insulation withstand voltage of the insulating layer 51 is increased.

The plurality of pad plug electrodes 82 are formed in a region between the high potential terminal 12 (the first high potential terminal 12A) and the high potential connection wiring 81 in the uppermost insulating layer 56, and are individually electrically connected to the high potential terminal 12 and the high potential connection wiring 81. Each of the plurality of pad plug electrodes 82 has a planar area less than a planar area of the high potential connection wiring 81.

Referring to FIG. 7, a distance D1 between the low potential terminal 11 and the high potential terminal 12 is preferably greater than a distance D2 between the low potential coil 22 and the high potential coil 23 (D2<D1). The distance D1 is preferably greater than a total thickness DT of the plurality of interlayer insulating layers 57 (DT<D1). A ratio D2/D1 of the distance D2 to the distance D1 can be between about 0.01 and about 0.1. The distance D1 is preferably between about 100 μm and about 500 μm. The distance D2 can also be between about 1 μm and about 50 μm. The distance D2 is preferably between about 5 μm and about 25 μm. Values of the distance D1 and the distance D2 can be any as desired, and are appropriately adjusted according to an insulation withstand voltage to be implemented.

Referring to FIG. 6 and FIG. 7, the semiconductor device 7 includes a dummy pattern 85 buried in the insulating layer 51 to be located around the transformers 21A to 21D in the plan view.

The dummy pattern 85 is formed by a pattern different (a discontinuous pattern) from the high potential coil 23 and the low potential coil 22, and is independent from the transformers 21A to 21D. That is to say, the dummy pattern 75 does not function as the transformers 21A to 21D. The dummy pattern 85 is formed as a shielding conductor layer that shields an electric field between the low potential coils 22 and the high potential coils 23 in the transformers 21A to 21D, and suppresses the concentration of the electric field with respect to the high potential coil 23. In this implementation, the dummy pattern 85 is laid out in a round-about manner with a linear density equal to a linear density of the high potential coil 23 per unit area. The linear density of the dummy pattern 85 being equal to the linear density of the high potential coil 23 means that the linear density of the dummy pattern falls within a range of +20% of the linear density of the high potential coil 23.

A depth position of the dummy pattern 85 inside the insulating layer 51 can be any as desired, and is adjusted according to an intensity of an electric field to be alleviated. The dummy pattern 85 is preferably in a region close to the high potential coil 23 with respect to the low potential coil 22 in the normal direction Z. Moreover, the dummy pattern 85 being close to the high potential coil 23 in the normal direction Z means that, in the normal direction Z, a distance between the dummy pattern 85 and the high potential coil 23 is less than a distance between the dummy pattern 85 and the low potential coil 22.

In this case, the concentration of the electric field with respect to the high potential coil 23 can be appropriately suppressed. In the normal direction Z, the concentration of the electric field with respect to the high potential coil 23 can be better suppressed as the distance between the dummy pattern 85 and the high potential coil 23 decreases. The dummy pattern 85 is preferably formed in the same interlayer insulating layer 57 as the high potential coil 23. In this case, the concentration of the electric field with respect to the high potential coil 23 can be even more appropriately suppressed. The dummy pattern 85 includes a plurality of dummy patterns with different electrical states. The dummy pattern 85 can also include a high potential dummy pattern 86.

A depth position of the high potential dummy pattern 86 inside the insulating layer 51 can be any as desired, and is adjusted according to an intensity of an electric field to be alleviated. The high potential dummy pattern 86 is preferably in a region close to the high potential coil 23 with respect to the low potential coil 22 in the normal direction Z. Moreover, the high potential dummy pattern 86 being close to the high potential coil 23 in the normal direction Z means that, in the normal direction Z, a distance between the high potential dummy pattern 86 and the high potential coil 23 is less than a distance between the high potential dummy pattern 86 and the low potential coil 22.

The dummy pattern 85 includes a floating dummy pattern formed in an electrically floating state in the insulating layer 51 so as to be located around the transformers 21A to 21D in the plan view.

In this implementation, the floating dummy pattern is laid out in a round-about manner in a tight line to partially cover and partially expose a region around the high potential coil 23 in the plan view. The floating dummy pattern can be formed to have a shape of with an end or without an end.

A depth position of the floating dummy pattern inside the insulating layer 51 can be any as desired, and is adjusted according to an intensity of an electric field to be alleviated.

The number of the floating lines can be any as desired, and is adjusted according to an intensity of an electric field to be alleviated. The floating dummy pattern can also be formed of a plurality of floating lines.

Referring to FIG. 7, the semiconductor device 5 includes a second functional component 60 formed on the first main surface 42 of the semiconductor chip 41 in a component region 62. The second functional component 60 is formed by using a surface layer portion of the first main surface 42 of the semiconductor chip 41 and/or a region on the first main surface 42 of the semiconductor chip 41, and is covered by the insulating layer 51 (the lowermost insulating layer 55). In FIG. 7, the dotted lines shown at the surface layer portion of the first main surface 42 schematically represent the second functional component 60.

The second functional component 60 is electrically connected to the low potential terminal 11 by a low potential wiring, and is electrically connected to the high potential terminal 12 by a high potential wiring. Except for being laid in a round-about manner to connect the second functional component 60 to inside the insulating layer 51, the low potential wiring has a same structure as the first low potential wiring 31 (the second low potential wiring 32). Except for being laid in a round-about manner to connect the second functional component 60 to inside the insulating layer 51, the high potential wiring has a same structure as the first high potential wiring 33 (the second high potential wiring 34). Specific details of the low potential wiring and the high potential wiring of the second functional component 60 are omitted herein.

The second functional component 60 can include at least one of a passive component, a semiconductor rectifier and a semiconductor switching component. The second functional component 60 can also include a circuit network including a combination of at least two components selected from a passive component, a semiconductor rectifier and a semiconductor switching component. The circuit network can form part or all of an integrated circuit.

The passive component can include a semiconductor passive component. The passive component can also include any one or two of a resistor and a capacitor. The semiconductor rectifier component can include at least one of a pn junction diode, a PIN diode, a Zener diode, a Schottky diode and a fast recovery diode. The semiconductor switching component can include at least one of a bipolar function transistor (BJT), a metal insulator semiconductor field effect transistor (MISFET), an insulated gate bipolar junction transistor (IGBT) and a junction field effect transistor (JFET).

Referring to FIG. 5 to FIG. 7, the semiconductor device 5 further includes a sealing conductor 61 buried in the insulating layer 51. The sealing conductor 61 is buried at a distance from the insulating sidewalls 53A to 53D in the insulating layer 51, and divides the insulating layer 51 into the component region 62 and an outer region 63. The sealing conductor 61 suppresses moisture and cracks from entering the component region 62 from the outer region 63.

The component region 62 is a region including the first functional component 45 (the plurality of transformers 21), the second functional component 60, the plurality of low potential terminals 11, the plurality of high potential terminals 12, the first low potential wiring 31, the second low potential wiring 32, the first high potential wiring 33, the second high potential wiring 34 and the dummy pattern 85. The outer region 63 is a region outside the component region 62.

The sealing conductor 61 is electrically disconnected from the component region 62. More specifically, the sealing conductor 61 is electrically disconnected from the first functional component 45 (the plurality of transformers 21), the second functional component 60, the plurality of low potential terminals 11, the plurality of high potential terminals 12, the first low potential wiring 31, the second low potential wiring 32, the first high potential wiring 33, the second high potential wiring 34 and the dummy pattern 85. More specifically, the sealing conductor 61 is fixed at an electrically floating state. The sealing conductor 61 does not form any current path connected to the component region 62.

The sealing conductor 61 is formed to have a strip shape extending along the insulating sidewalls 53A to 53D in the plan view. In this implementation, the sealing conductor 61 is formed to have a quadrilateral loop shape (more specifically, a rectangular loop) in the plan view. Accordingly, the sealing conductor 61 defines the component region 62 having a quadrilateral shape (specifically, a rectangular shape) in the plan view. Moreover, the sealing conductor 61 defines the outer region 63 having a quadrilateral loop shape (specifically, a rectangular loop) surrounding the component region 62 in the plan view.

More specifically, the sealing conductor 61 includes an upper end at the side of the insulating main surface 52, a lower end at the side of the semiconductor chip 41, and a wall portion extending as a wall between the upper end and the lower end. In this implementation, the upper end of the sealing conductor 61 is formed at a distance from the insulating main surface 52 toward the side of the semiconductor chip 41, and is located in the insulating layer 51. In this implementation, the upper end of the sealing conductor 61 is covered by the uppermost insulating layer 56. The upper end of the sealing conductor 61 can also be covered by one or more interlayer insulating layers 57. The upper end of the sealing conductor 61 can also be exposed from the uppermost insulating layer 56. The lower end of the sealing conductor 61 is formed at a distance from the semiconductor chip 41 toward the side of the upper end.

As such, in this implementation, the sealing conductor 61 is buried in the insulating layer 51 to be located on the side of the semiconductor chip 41 with respect to the plurality of low potential terminals 11 and the plurality of high potential terminals 12. Moreover, in the insulating layer 51, the sealing conductor 61 faces the first functional component 45 (the plurality of transformers 21), the first low potential wiring 31, the second low potential wiring 32, the first high potential wiring 33, the second high potential wiring 34 and the dummy pattern 85 in a direction in parallel to the insulating main surface 52. In the insulating layer 51, the sealing conductor 61 can also face a part of the second functional component 60 in a direction in parallel to the insulating main surface 52.

The sealing conductor 61 includes a plurality of sealing plug conductors 64, and one or more (multiple in this implementation) sealing path conductors 65. The number of the sealing path conductors 65 can be any as desired. The uppermost sealing plug conductor 64 of the plurality of sealing plug conductors 64 forms the upper end of the sealing conductor 61. The plurality of sealing path conductors 65 individually form the lower end of the sealing conductor 61. The sealing plug conductors 64 and the sealing path conductors 65 are preferably formed of a same conductive material as the low potential coil 22. That is to say, each of the sealing plug conductors 64 and the sealing path conductors includes a barrier layer and a body layer, as the low potential coil 22.

The plurality of sealing plug connectors 64 are respectively buried in the plurality of interlayer insulating layers 57, and each forms a quadrilateral loop shape (more specifically, a rectangular loop shape) surrounding the component region 62 in the plan view. The plurality of sealing plug conductors 64 are laminated from the lowermost insulating layer 55 toward the uppermost insulating layer 56 to be connected to one another. The number of the plurality of sealing plug conductors 64 laminated is consistent with the number of the plurality of interlayer insulating layers 57 laminated. As a matter of course, one or more sealing plug conductors 64 passing through the plurality of interlayer insulating layers 57 can also be formed.

If one loop-shaped sealing conductor 61 is formed by an integral of the plurality of sealing plug conductors 64, it is not necessary for all of the plurality of sealing plug conductors 64 to be formed to have a loop shape. For example, at least one of the plurality of sealing plug conductors 64 can be formed to have a shape with an end. Moreover, at least one of the plurality of sealing plug conductors 64 can be divided to include a plurality of strip portions with ends. However, in view of the risk of moisture and cracks entering the component region 62, the plurality of sealing plug conductors 64 are preferably formed to be shapes without ends (formed as loops).

The plurality of sealing path conductors 65 are formed in a region between the semiconductor chip 41 and the sealing plug conductors 64 in the lowermost insulating layer 55. The plurality of sealing path conductors 65 are formed at a distance from the semiconductor chip 41, and are connected to the sealing plug conductors 64. The plurality of sealing path conductors 65 have a planar area less than a planar area of the sealing plug conductors 64. When a single sealing path conductor 65 is formed, the single sealing path conductor 65 can also have a planar area greater than the planar area of the sealing plug conductors 64.

A width of the sealing conductor 61 can be between about 0.1 μm and about 10 μm. The width of the sealing conductor 61 is preferably between about 1 μm and about 5 μm. The width of the sealing conductor 61 is determined by a width in a direction perpendicular to an extension direction of the sealing conductor 61.

Referring to FIG. 7 and FIG. 8, the semiconductor device 5 further includes a separation structure 130, which is located between the semiconductor chip 41 and the sealing conductor 61 and electrically disconnects the sealing conductor 61 and the semiconductor chip 41. The separation structure 130 preferably includes an insulator. In this implementation, the separation structure 130 includes a field insulating film 131 formed on the first main surface 42 of the semiconductor chip 41.

The field insulating film 131 includes at least one of an oxide film (a SiO film) and a nitride film (a SiN film). The field insulating film 131 preferably includes a local oxidation of silicon (LOCOS) film, which is an example of an oxide film formed by oxidizing the first main surface 42 of the semiconductor chip 41. A thickness of the field insulating film 131 can be any as desired, provided that the semiconductor chip 41 and the sealing conductor 61 can be insulated. The thickness of the field insulating film 13 can be between about 0.1 μm and about 5 μm.

The separation structure 130 is formed on the first main surface 42 of the semiconductor chip 41, and extends as a strip shape along the sealing conductor 61 in the plan view. In this implementation, the separation structure 130 is formed to have a quadrilateral loop shape (more specifically, a rectangular loop) in the plan view. The separation structure 130 includes a connection portion 132 connected to the lower end of the sealing conductor 61 (the sealing path conductor 65). The connecting portion 132 can also form an anchor portion for which the lower end of the sealing conductor 61 (the sealing via conductor 65) bites toward the side of the semiconductor chip 41. As a matter of course, the connecting portion 132 can also be formed as a leveled surface with respect to a main surface of the separation structure 130.

The separation structure 130 includes an inner end 130A on the side of the component region 62, an outer end 130B on the side of the outer region 63, and a body 130C between the inner end 130A and the outer end 130B. The inner end 130A defines a region in which the second functional component 60 is formed (that is, the component region 62) in the plan view. The inner end 130A can also be formed as an integral with an insulating film (not shown) formed on the first main surface 42 of the semiconductor chip 41.

The outer end 130B is exposed from the chip sidewalls 44A to 44D of the semiconductor chip 41, and is connected to the chip sidewalls 44A to 44D of the semiconductor chip 41. More specifically, the outer end 130B is formed as a leveled surface relative to the chip sidewalls 44A to 44D of the semiconductor chip 41. The outer end 130B is formed as a leveled grinding surface between the chip sidewalls 44A to 44D of the semiconductor chip 41 and the insulating sidewalls 53A to 53D of the insulating layer 51. In other implementations, the outer end 130B can also be formed at a distance from the chip sidewalls 44A to 44D in the first main surface 42.

The body 130C has a flat surface extending nearly in parallel to the first main surface 42 of the semiconductor chip 41. The body 130C includes a connection portion 132 connected to the lower end of the sealing conductor 61 (the sealing path conductor 65). The connecting portion 132 is formed at a distance from the inner end 130A and the outer end 130B in a part of the body 130C. The separation structure 130 can be implemented in various forms instead of the field insulating film 131.

Referring to 7, the semiconductor device 5 further includes an inorganic insulating layer 140 formed on the first main surface 52 of the semiconductor chip 51 to cover the sealing conductor 61. The organic insulating layer 140 can also be referred to as a passivation layer. The inorganic insulating layer 140 protects the insulating layer 51 and the semiconductor chip 41 on the insulating main surface 52.

In this implementation, the inorganic insulating layer 140 has a laminated structure including a first inorganic insulating layer 141 and a second inorganic insulating layer 142. The first inorganic insulating layer 141 can include SiO. The first inorganic insulating layer 141 is preferably undoped silicate glass (USG) which is SiO without any impurity. A thickness of the first inorganic insulating layer 141 can be between about 50 μm and about 5000 μm. The second inorganic insulating layer 142 can include SiN. A thickness of the second inorganic insulating layer 142 can be between about 500 μm and about 5000 μm. By increasing a total thickness of the inorganic insulating layer 140, the insulation withstand voltage on the high potential coil 23 can be increased.

When the first inorganic insulating layer 141 includes USG and the second inorganic insulating layer 142 includes SiN, an insulation breakdown voltage (V/cm) of the USG is greater than an insulation breakdown voltage (V/cm) of the SiN. Thus, when the inorganic insulating layer 140 is designed to be thick, the first inorganic insulating layer 141 is preferably formed to be thicker than the second inorganic insulating layer 142.

The first inorganic insulating layer 141 can include at least one of boron doped phosphor silicate glass and phosphorous silicate glass (PSG) as an example of SiO. However, in this case, since the SiO includes an impurity (boron or phosphor), the first inorganic insulating layer 141 containing USG is preferably formed in order to increase the insulation withstand voltage on the high potential coil 23. As a matter of course, the inorganic insulating layer 140 can also be a single-layer structure which includes any one between the first inorganic insulating layer 141 and the second inorganic insulating layer 142.

The inorganic insulating layer 140 covers all of the sealing conductor 61, and includes a plurality of low potential pad openings 143 and a plurality of high potential pad openings 144 formed in a region outside the sealing conductor 61. The plurality of low potential pad openings 143 respectively expose the plurality of low potential terminals 11. The plurality of high potential pad openings 143 respectively expose the plurality of high potential terminals 12. The inorganic insulation layer 140 can include an overlapping portion which climbs up a peripheral portion of the low potential terminals 11. The inorganic insulation layer 140 can also include an overlapping portion which climbs up a peripheral portion of the high potential terminals 12.

The semiconductor device 5 further includes an organic insulating layer 145 formed on inorganic insulation layer 140. The organic insulation layer 145 can include a photosensitive resin. The organic insulating layer 145 can also include at least one of polyimide, polyamide and polybenzoxazole. In this implementation, the organic insulating layer 145 includes polyamide. A thickness of the organic insulating layer 145 can be between about 1 μm and about 50 μm.

The thickness of the organic insulating layer 145 is preferably greater than the total thickness of the inorganic insulating layer 140. Moreover, a total thickness of the inorganic insulation layer 140 and the organic insulation layer 145 is preferably greater than the distance D2 between the low potential coil 22 and the high potential coil 23. In this case, the total thickness of the inorganic insulating layer 140 is preferably between about 2 μm and about 10 μm. Moreover, the thickness of the organic insulating layer 145 is preferably between about 5 μm and about 50 μm. According to the structures above, thickening of the inorganic insulating layer 140 and the organic insulating layer 145 can be suppressed, and at the same time the insulation withstand voltage on the high potential coil 23 can be appropriately increased by the laminated films of the inorganic insulating layer 140 and the organic insulating film 145.

The organic insulating layer 145 includes a first portion 146 covering a region on the low potential side and a second portion 147 covering a region on the high potential side. The first portion 146 is separated by the inorganic insulating layer 140 to cover the sealing conductor 61. The first portion 146 includes a plurality of low potential terminal openings 148 exposing the plurality of low potential terminals 11 (the low potential pad openings 143) in a region outside the sealing conductor 61. The first portion 146 can also include an overlapping portion which climbs up a periphery (an overlapping portion) of the low potential pad openings 143.

The second portion 147 is formed at a distance from the first portion 146, and exposes the inorganic insulating layer 140 from amidst the first portion 146. The second portion 147 includes a plurality of high potential terminal openings 149 exposing the plurality of high potential terminals 12 (the high potential pad openings 144)1. The second portion 147 can also include an overlapping portion which climbs up a periphery (an overlapping portion) of the high potential pad openings 144.

The second portion 147 universally covers the transformers 21A to 21D and the dummy pattern 85. More specifically, the second portion 147 universally covers the plurality of high potential coils 23, the plurality of high potential terminals 12, the first high potential dummy pattern 87 (including a first pattern 93, a second pattern 94 and a third pattern 95), the second high potential dummy pattern 88 and the floating dummy pattern 121.

The embodiments of the present disclosure can also be implemented in form of other embodiments. In the embodiment, an example in which the first functional component 45 and the second functional component 60 are formed is described. However, an implementation without the first functional component 45 but including only the second functional component 60 can also be practiced. In this case, the dummy pattern 85 can be removed. According to the structure above, regarding the second functional component 60, the same effects as those of the first embodiment can be achieved.

That is to say, when a voltage is applied to the second functional component 60 through the low potential terminal 11 and the high potential terminal 12, an unexpected conduction between the high potential terminal 12 and the sealing conductor 61 can be suppressed. Moreover, when a voltage is applied to the second functional component 60 through the low potential terminal 11 and the high potential terminal 12, an unexpected conduction between the low potential terminal 11 and the sealing conductor 61 can be suppressed.

Moreover, in the embodiments, an example in which the second functional component 60 is formed is described. However, the second functional component 60 is not necessary and can also be omitted.

In the embodiments, an example in which the dummy pattern 85 is formed is described. However, the dummy pattern 85 is not necessary and can also be omitted.

Moreover, in the embodiments, an example in which the first functional component 45 is configured as a multichannel type including the plurality of transformers 21 is described. However, the first functional component 45 configured as a single-channel type including a single transformer 21A can also be used.

<Arrangement of Transformers>

Figure 9:
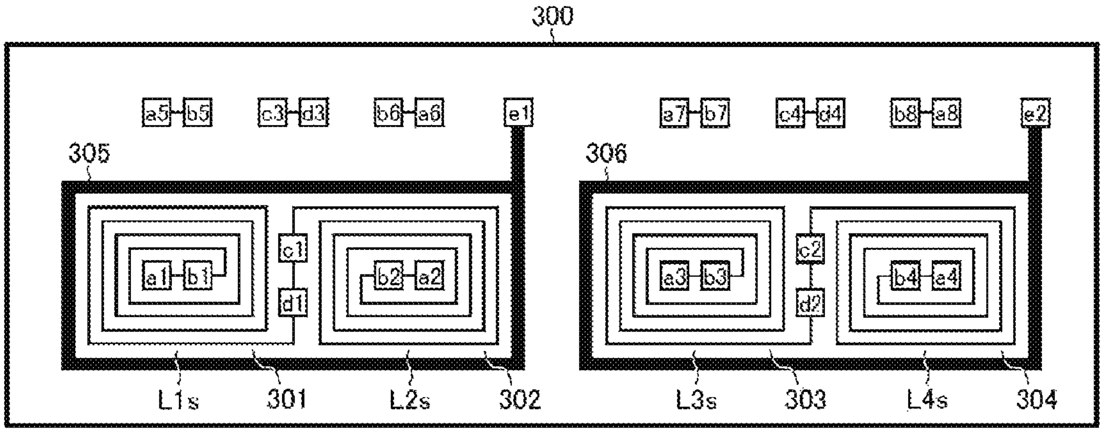
FIG. 9 is a diagram of a layout example of a transformer chip.

FIG. 9 shows a plan view (a top view) of an example of an arrangement of transformers in a two-channel transformer chip 300 (equivalent to the semiconductor device 5 above). The transformer chip 300 of this drawing includes a first transformer 301, a second transformer 302, a third transformer 303, a fourth transformer 304, a first protection ring 305, a second protection ring 306, pads a1 to a8, pads b1 to b8, pads c1 to c4 and pads d1 to d4.

In the transformer chip 300, the pads a1 and b1 are connected to one end of a secondary-side coil L1*s* forming the first transformer 301, and the pads c1 and d1 are connected to the other end of the secondary-side coil L1*s*. The pads a2 and b2 are connected to one end of a secondary-side coil L2*s* forming the second transformer 302, and the pads c1 and d1 are connected to the other end of the secondary-side coil L2*s*.

Moreover, the pads a3 and b3 are connected to one end of a secondary-side coil L3s forming the third transformer 303, and the pads c2 and d2 are connected to the other end of the secondary-side coil L3s. The pads a4 and b4 are connected to one end of a secondary-side coil L4s forming the fourth transformer 304, and the pads c2 and d2 are connected to the other end of the secondary-side coil L4s.

Moreover, a primary-side coil forming the first transformer 301, a primary-side coil forming the second transformer 302, a primary-side coil forming the third transformer 303 and a primary-side coil forming the fourth transformer 304 are not shown in this drawing. However, the primary-side coils respectively have the same structures as the secondary-side coils L1s to L4s, and are arranged directly below the respective secondary-side coils L1s to L4s to face these secondary-side coils L1s to L4s, respectively.

That is to say, the pads a5 and b5 are connected to one end of the primary-side coil forming the first transformer 301, and the pads c3 and d3 are connected to the other end of the primary-side coil. Moreover, the pads a6 and b6 are connected to one end of the primary-side coil forming the second transformer 302, and the pads c3 and d3 are connected to the other end of the primary-side coil.

Moreover, the pads a7 and b7 are connected to one end of the primary-side coil forming the third transformer 303, and the pads c4 and d4 are connected to the other end of the primary-side coil. Moreover, the pads a8 and b8 are connected to one end of the primary-side coil forming the fourth transformer 304, and the pads c4 and d4 are connected to the other end of the primary-side coil.

However, the pads a5 to a8, the pads b5 to b8, the pads c3 and c4 and the pads d3 and d4 are led out to a surface from the inside of the transformer chip 300 via a path not shown in the drawing.

The pads a1 to a8 of the plurality of pads are equivalent to first current supply pads, and the pads b1 to b8 are equivalent to first voltage measurement pads. Moreover, the pads c1 to c4 are equivalent to second current supply pads, and the pads d1 to d4 are equivalent to second voltage measurement pads.

Hence, with respect to the transformer chip 300 of this configuration example, a series resistance component of each coil can be accurately measured during an inspection of defective products. Thus, in addition to avoiding production of defective products with disconnections in each coil, production of defective products with abnormal resistance values of each coil (for example, short-circuit among coils) can be appropriately avoided, further preventing in advance defective products from being available on the market.

In addition, for the transformer chip 300 having passed the inspection of defective products, the plurality of pads are used as a connection mechanism between a primary-side chip and a secondary-side chip (for example, the controller chip 210 and the driver 220 described above).

More specifically, the pads a1 and b1, the pads a2 and b2, the pads a3 and b3, and the pads a4 and b4 may be respectively connected to signal input terminals or signal output terminals of the secondary-side chip. Moreover, each of the pads c1, d1 and the pads c2, d2 may be connected to a common voltage application end (GND2) of the secondary-side chip.

Moreover, the pads a5 and b5, the pads a6 and b6, the pads a7 and b7, and the pads a8 and b8 may be respectively connected to signal input terminals or signal output terminals of the primary-side chip. Moreover, each of the pads c3, d3 and the pads c4, d4 may be connected to a common voltage application end (GND1) of the primary-side chip.

Herein, as shown in FIG. 9, the first transformer 301 to the fourth transformer 304 perform coupling according to each of the signal transmission directions and are thus arranged. According to the illustration of this drawing, for example, the first transformer 301 and the second transformer 302 which transmit signals from the primary-side chip to the secondary-side chip become a first pair via the first protection ring 305. Moreover, for example, the third transformer 303 and the fourth transformer 304 which transmit signals from the secondary-side chip to the first-side chip become a second pair via the second protection ring 306.

The reason for the coupling is that, when primary-side coils and secondary-side coils forming the first transformer 301 to the fourth transformer 304 are laminated in a manner of being stacked in a vertical direction of the substrate of the transformer chip 300, a withstand voltage between the primary-side coils and the secondary-side coils is ensured. However, the first protection ring 305 and the second protection ring 306 are not necessary constituting elements.

In addition, the first protection ring 305 and the second protection ring 306 are connected to a low impedance wiring such as a ground terminal via the pads e1 and e2, respectively.

Moreover, in the transformer chip 300, the pads c1 and d1 are shared between the secondary-side coil L1s and the secondary-side coil L2s. Moreover, the pads c2 and d2 are shared between the secondary-side coil L3s and the secondary-side coil L4s. Moreover, the pads c3 and d3 are shared between the primary-side coil L1p and the primary-side coil L2p. Moreover, the pads c4 and d4 are shared between the corresponding primary-side coils. With the setting of the configuration above, the number of pads can be reduced to implement miniaturization of the transformer chip 300.

Moreover, as shown in FIG. 9, it is desired that each of the primary-side coils and the secondary-side coils of the first transformer 301 to the fourth transformer 304 is wound to have a rectangular shape (or a track with rounded corners) in a plan view of the transformer chip 300. With the setting of the configuration above, an area of an overlapping portion of the primary-side coils and the secondary-side coils is increased, hence improving transmission efficiency of the transformers.

It should be noted that the arrangement of the transformers in this drawing is merely an example, and the number, shape and configuration of the coils as well as the arrangement of the pads can be any as desired. Moreover, the chip structure and the arrangement of the transformers described so far are applicable to an entire semiconductor device in which coils are integrated on the semiconductor chip.

<Signal Transmission Device (Brief Configuration)>

Figure 10:
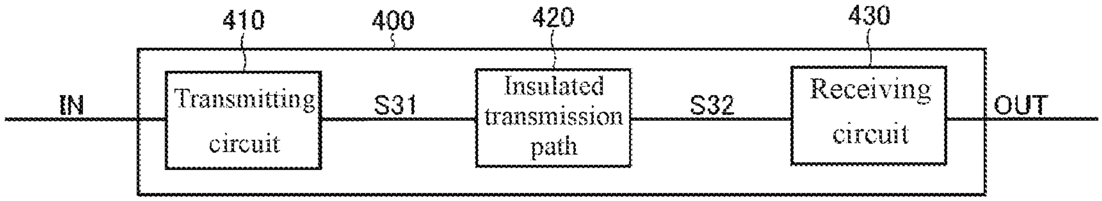
FIG. 10 is a diagram of a brief configuration of a signal transmission device.

FIG. 10 shows a diagram of a general brief configuration of a signal transmission device (a so-called integrated circuit (IC)). The signal transmission device 400 of this configuration example includes a transmitting circuit 410, an insulated transmission path 420 and a receiving circuit 430.

The transmitting circuit 410 receives an input pulse signal IN and outputs a transmission pulse signal S31.

The insulated transmission path 420 insulates the transmitting circuit 410 and the receiving circuit 430, and transmits the transmission pulse signal S31 output from the transmitting circuit 410 as a reception pulse signal S32 to the receiving circuit 430. The insulated transmission path 420 includes an insulating transmission element such as a coil (for example, a transformer), a capacitor or an optical component (for example, an optical coupler).

The receiving circuit 430 receives the reception pulse signal S32 output from the insulated transmission path 420 and outputs an output pulse signal OUT. In addition, the output pulse signal OUT can also be a drive pulse signal for driving a motor to rotate.

However, a component for insulated communications is required to have higher reliability. For example, the signal transmission device 400 mounted on an industrial machine or vehicle is required to continue signal transmission in the event of a malfunction of the insulated transmission path 420 so that the system can operate safety.

<Signal Transmission Device (First Comparison Example)>

Figure 11:
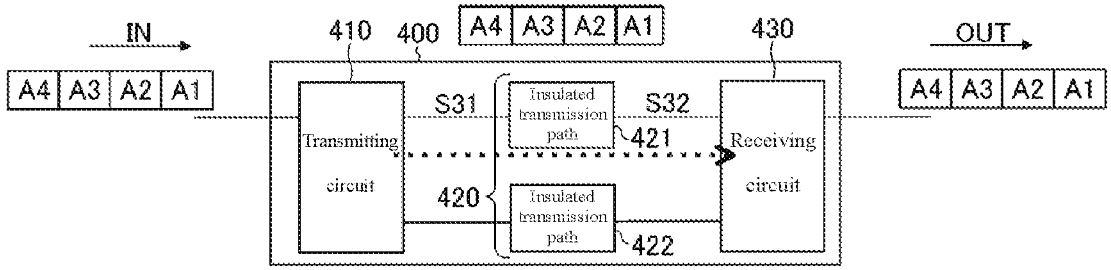
FIG. 11 is a diagram of a first comparison example of a signal transmission device.

FIG. 11 shows a diagram of a first comparison example (equivalent to a malfunction countermeasure compared with an embodiment described below) of the signal transmission device 400.

By using the previous brief configuration (FIG. 10) as a basis, the signal transmission device 400 of this comparison example includes a plurality of insulated transmission paths (insulated transmission paths 421 and 422 in this drawing) as the insulated transmission path 420. Moreover, the insulated transmission path 421 is a main transmission path, while the insulated transmission path 422 is a reserved transmission path. That is to say, in the signal transmission device 400 of the first comparison example, the insulated transmission path 420 is multiplexed (duplexed in this drawing) in a redundant manner.

For example, when the insulated transmission path 421 does not contain any malfunction, as shown by the dotted arrow in this drawing, signal transmission is performed via the insulated transmission path 421. That is to say, the insulated transmission path 421 transmits the transmission pulse signal S31 output from the transmitting circuit 410 as a reception pulse signal S32 to the receiving circuit 430. As a result, the input pulse signal IN (equivalent to a data string A1A2A3A4, wherein each of A1 to A4 is a 1-bit (H/L) data) is used as the output pulse signal OUT (equivalent to an output data string A1A2A3A4) and transmitted.

Figure 12:
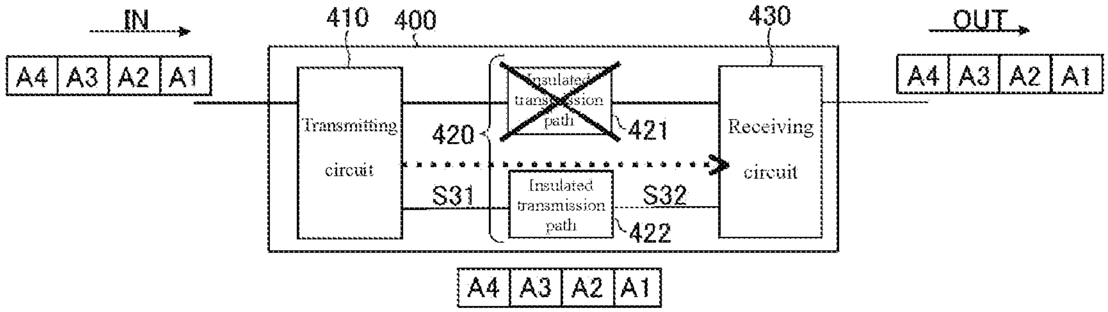
FIG. 12 is a diagram of a first comparison example (in malfunction) of a signal transmission device.

FIG. 12 shows a diagram of behaviors during a malfunction of the insulated transmission path 421 in the signal transmission device 400 of the first comparison example.

In the event of a malfunction of the insulated transmission path 421 due to component degradation or a malfunction from an external component, as shown by the dotted line in this drawing, signal transmission is performed via the reserved insulating transmission path 422. That is to say, the insulated transmission path 422 transmits the transmission pulse signal S31 output from the transmitting circuit 410 as a reception pulse signal S32 to the receiving circuit 430. As a result, the input pulse signal IN (equivalent to the data string A1A2A3A4) is used as the output pulse signal OUT (equivalent to the output data string A1A2A3A4) and transmitted.

With regard to the signal transmission device 400 of the first comparison example, even if the main insulated transmission path 421 malfunctions, signal transmission can be continued by using the reserved insulated transmission path 422. However, the reserved insulated transmission path 422 is still needed even when there is no malfunction in the main insulated transmission path 421. Thus, an increase in costs of the signal transmission device 400 is resulted.

<Signal Transmission Device (Second Comparison Example)>

Figure 13:
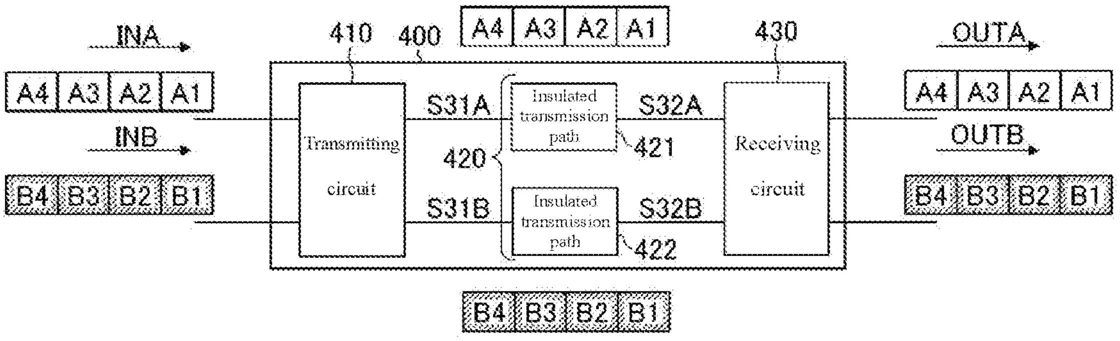
FIG. 13 is a diagram of a second comparison example of a signal transmission device.

FIG. 13 shows a diagram of a second comparison example (equivalent to two-channel configuration example compared with an embodiment described below) of the signal transmission device 400.

Similar to the first comparison example (FIG. 11), the signal transmission device 400 of the second comparison example includes a plurality of insulated transmission paths (insulated transmission paths 421 and 422 in this drawing) as the insulated transmission path 420. However, the insulated transmission path 422 is not a reserve of the insulated transmission path 421. The signal transmission device 400 uses both of the insulated transmission paths 421 and 422 to implement signal transmission in parallel in a same direction.

The transmitting circuit 410 receives an input pulse signal INA (equivalent to the data string A1A2A3A4) of a first channel, and outputs a transmission pulse signal S31A (equivalent to a transmission data string A1A2A3A4) of the first channel.

Moreover, the transmitting circuit 410 receives an input pulse signal INB (equivalent to a data string B1B2B3B4) of a second channel, and outputs a transmission pulse signal S31B (equivalent to a transmission data string B1B2B3B4) of the second channel.

The insulated transmission path 421 insulates between the transmitting circuit 410 and the receiving circuit 430, and transmits the transmission pulse signal S31A of the first channel output from the transmitting circuit 410 as a reception pulse signal S32A of the first channel to the receiving circuit 430.

Moreover, the insulated transmission path 422 insulates between the transmitting circuit 410 and the receiving circuit 430, and transmits the transmission pulse signal S31B of the second channel output from the transmitting circuit 410 as a reception pulse signal S32B of the second channel to the receiving circuit 430.

The receiving circuit 430 receives the reception pulse signal S32A of the first channel output from the insulated transmission path 421 and outputs an output pulse signal OUTA (equivalent to the output data string A1A2A3A4) of the first channel.

Moreover, the receiving circuit 430 receives the reception pulse signal S32B of the second channel output from the insulated transmission path 422 and outputs an output pulse signal OUTB (equivalent to the output data string B1B2B3B4) of the second channel.

In the signal transmission device 400 of the second comparison example, if at least one between the insulated transmission paths 421 and 422 malfunctions, signal transmission cannot be correctly performed. Moreover, if multiplexing as the insulated transmission path 420 of the first comparison example (FIG. 1) is implemented, continuity of signal transmission can be ensured. However, as described above, the issue lies in that an increase in costs of the signal transmission device 400 is resulted.

<Signal Transmission Device (Implementation)>

Figure 14:
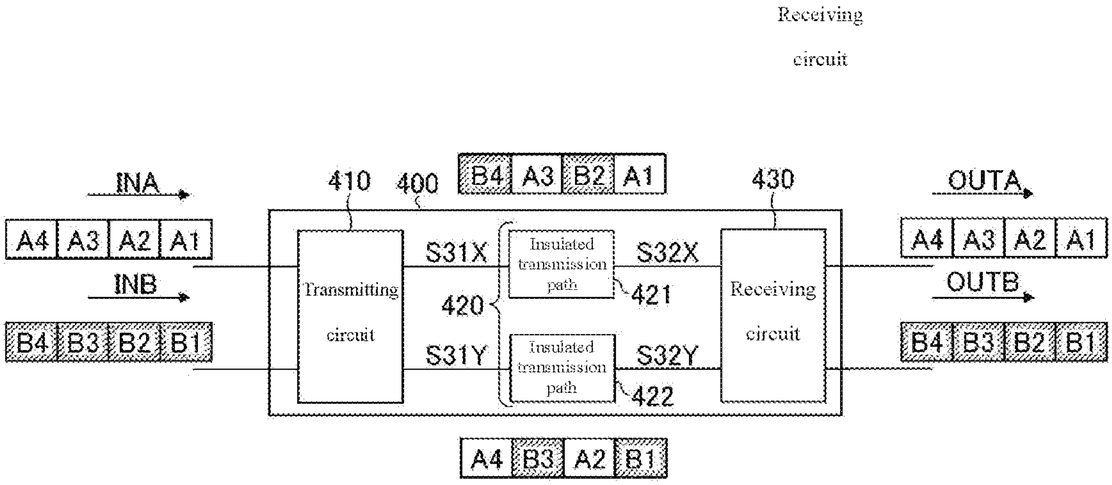
FIG. 14 is a diagram of a signal transmission device according to an embodiment.

FIG. 14 shows a diagram of the signal transmission device 400 in a novel embodiment. The signal transmission device 400 of this embodiment uses the second comparison example (FIG. 13) as a basis, and modifies respective internal signal processing of the transmitting circuit 410 and the receiving circuit 430.

The transmitting circuit 410 generates a transmission pulse signal S31X (equivalent to a mixed data string A1B2A3B4) according to an input pulse signal INA (equivalent to a data string A1A2A3A4) and an input pulse signal INB (equivalent to a data string B1B2B3B4).

Moreover, the transmitting circuit 410 generates a transmission pulse signal S31Y (equivalent to a mixed data string B1A2B3A4) according to the input pulse signal INA (equivalent to the data string A1A2A3A4) and the input pulse signal INB (equivalent to the data string B1B2B3B4).

As illustrated according to this drawing, for the data A1 to A4 included in the input pulse signal INA (equivalent to the data string A1A2A3A4) and the data B1 to B4 included in the input pulse signal INB (equivalent to the mixed data string B1A2B3A4), sequentially switches from the beginning and outputs each data according to every bit to one of the insulated transmission paths 421 and 422.

That is to say, the transmitting circuit 410 alternately switches an output destination of each of the data A1 to A4 and the data B1 to B4, while generating the transmission pulse signals S31X and S31Y. Thus, the transmission pulse signal S31X of the first channel becomes the mixed data string A1B2A3B4 including the data A1 and A3 of the first channel and the data B2 and B4 of the second channel. Moreover, the transmission pulse signal S31Y of the second channel becomes the mixed data string B1A2B3A4 including the data A2 and A4 of the first channel and the data B1 and B3 of the second channel.

The insulated transmission path 421 insulates between the transmitting circuit 410 and the receiving circuit 430, and transmits the transmission pulse signal S31X of the first channel output from the transmitting circuit 410 as a reception pulse signal S32X of the first channel to the receiving circuit 430. That is to say, the mixed data string B1A2B3A4 is transmitted to the insulating transmission path 421.

Moreover, the insulated transmission path 422 insulates between the transmitting circuit 410 and the receiving circuit 430, and transmits the transmission pulse signal S31Y of the second channel output from the transmitting circuit 410 as a reception pulse signal S32B of the second channel to the receiving circuit 430. That is to say, the mixed data string B1A2B3A4 is transmitted to the insulating transmission path 422.

The receiving circuit 430 restores a first output signal OUTA (equivalent to the data string A1A2A3A4) equivalent to the input pulse signal INA of the first channel according to the reception pulse signal S32X (equivalent to the mixed data string A1B2A3B4) of the first channel and the reception pulse signal S32Y (equivalent to the mixed data string B1A2B3A4) of the second channel.

The receiving circuit 430 restores a second output signal OUTB (equivalent to the data string B1B2B3B4) equivalent to the input pulse signal INB of the second channel according to the reception pulse signal S32X (equivalent to the mixed data string A1B2A3B4) of the first channel and the reception pulse signal S32Y (equivalent to the mixed data string B1A2B3A4) of the second channel.

For example, a case where neither of the insulated transmission paths 421 and 422 malfunctions is taken into consideration. In this case, as shown in this drawing, the mixed data string A1B2A3B4 is transmitted in an insulated manner via the insulated transmission path 421. Moreover, the mixed data string B1A2B3A4 is transmitted in an insulated manner via the insulated transmission path 422. Thus, in the receiving circuit 430, the output pulse signals OUTA and OUTB without any data loss are restored. As a result, the input pulse signal IN (equivalent to the data string A1A2A3A4) is used as the output pulse signal OUT (equivalent to an output data string A1A2A3A4) and transmitted correctly.

Figure 15:
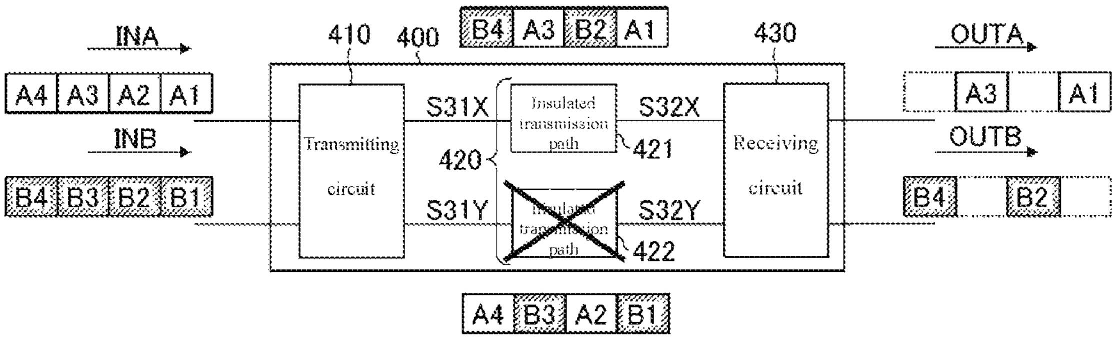
FIG. 15 is a diagram of a signal transmission device (in malfunction) according to an embodiment.

FIG. 15 shows a diagram of behaviors during a malfunction of the insulated transmission path 422 in the signal transmission device 400 of this embodiment.

In the event of a malfunction of the insulated transmission path 422 due to component degradation or a malfunction from an external component, the mixed data string B1A2B3A4 that should be transmitted via the insulated transmission path 422 is lost, while the mixed data string A1B2A3B4 is transmitted to the receiving circuit 430 via the malfunction-free insulated transmission path 421. Thus, in the receiving circuit 430, although part of the data is lost, the output pulse signals OUTA and OUTB can still be restored.

According to the illustration of this drawing, the receiving circuit 430 receives the reception pulse signal S32X of the first channel output from the insulated transmission path 421 and outputs an output pulse signal OUTA (equivalent to the output data string A1(A1)A3(A3)) of the first channel.

Moreover, the receiving circuit 430 receives the reception pulse signal S32X of the first channel output from the insulated transmission path 421 and outputs an output pulse signal OUTB (equivalent to the output data string B2(B2) B4(B4)) of the second channel.

As such, with regard to the signal transmission device 400 of this embodiment, even if one between the insulated transmission paths 421 and 422 malfunctions, only a state in which the communication speed is reduced without incurring a complete halt in functions is resulted, and so signal transmission can be continued. Thus, even if the insulated transmission path 420 malfunctions, signal transmission can be continued and the system (an industrial machine or a vehicle) is able to continue operating safety.

Moreover, different from the first comparison example (FIG. 11), the signal transmission device 400 of this embodiment does not need a reserve insulating transmission path. Thus, an increase in costs of the signal transmission device 400 is not resulted.

<Observations Related to Switching Timing of Data>

In order to implement internal signal processing, as described above, the output destination of each of the data A1 to A4 included in the input pulse signal INA (equivalent to the data string A1A2A3A4) and the data B1 to B4 included in the input pulse signal INB (equivalent to the data string B1B2B3B4) needs to be alternately switched according to a predetermined switching timing.

In addition, an entity alternately switching the output destination of data A1 to A4 and an entity alternately switching the output destination of the data B1 to B4 are both the transmitting circuit 410. Thus, the switching timing in the transmitting circuit 410 can be set as desired.

On the other hand, the receiving circuit 430 operates asynchronously from the transmitting circuit 410. Thus, for the receiving circuit 430 to restore the output pulse signals OUTA and OUTB, the receiving circuit 430 needs to be notified of the switching timing from the transmitting circuit 410.

As a simplest approach, another additional insulated transmission path solely for the notification of the switching timing is added. However, in the approach above, similar to the first comparison example (FIG. 11), an increase in costs of the signal transmission device 400 can be resulted. Moreover, in the event of a malfunction of the insulated transmission path for the notification of the switching timing, restoration of both of the output pulse signals OUTA and OUTB cannot be achieved and thus signal transmission cannot be continued.

Thus, in view of the observations above, the transmitting circuit 410 adds a switching timing flag STF to each data while generating the transmission pulse signal S31X (equivalent to the data string A1B2A3B4). Moreover, the transmitting circuit 410 adds the switching timing flag STF to each data while generating the transmission pulse signal S31Y (equivalent to the data string B1A2B3A4).

The receiving circuit 430 restores the output pulse signals OUTA and OUTB according to the switching timing flag STF added for each data.

<Switching Timing Flag (First Example)>

Figure 16:
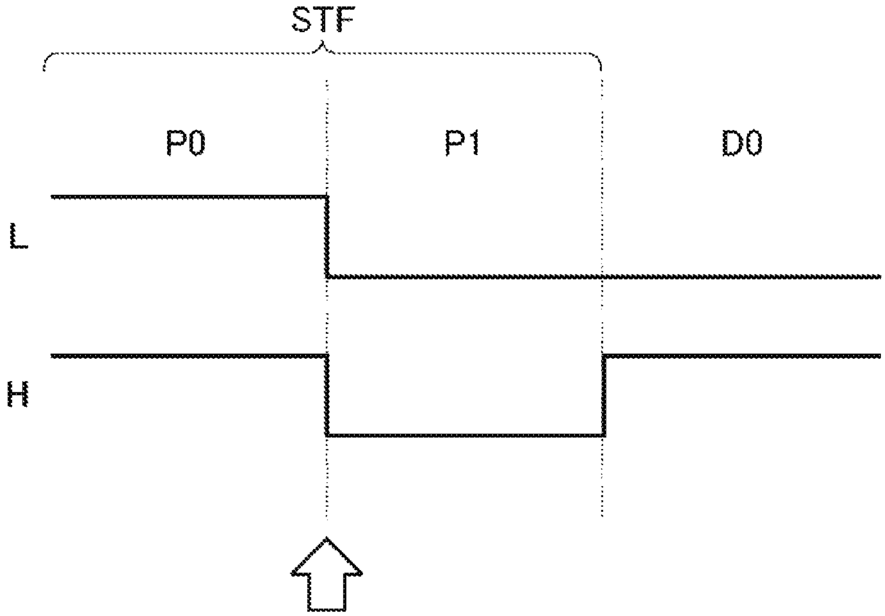
FIG. 16 is a diagram of a first example of a switching timing flag.

FIG. 16 shows a diagram of a first example of the switching timing flag STF. In this drawing, the switching timing flag STF is added to a header of a data D0. In addition, the switching timing flag STF of the first example includes flag pulses P0 and P1 having different logic levels. For example, the flag pulse P0 can be at a high level and the flag pulse P1 can be at a low level.

As shown by the upper part of this drawing, when the data D0 is at a low level, transmission is performed in a continuous manner of the flag pulse P0 at a high level, the flag pulse P1 at a low level and the data D0 at a low level. On the other hand, as shown by the lower part of this drawing, when the data D0 is at a high level, transmission is performed in a continuous manner of the flag pulse P0 at a high level, the flag pulse P1 at a low level and the data D0 at a high level.

That is to say, the switching timing flag STF does not depend on the logic level of the data D0, and always includes a pulse edge from a high level to a low level (a falling edge). Thus, the receiving circuit 430 can learn the timing for switching the output destination of the data by detecting the pulse edge.

<Receiving Circuit>

Figure 17:
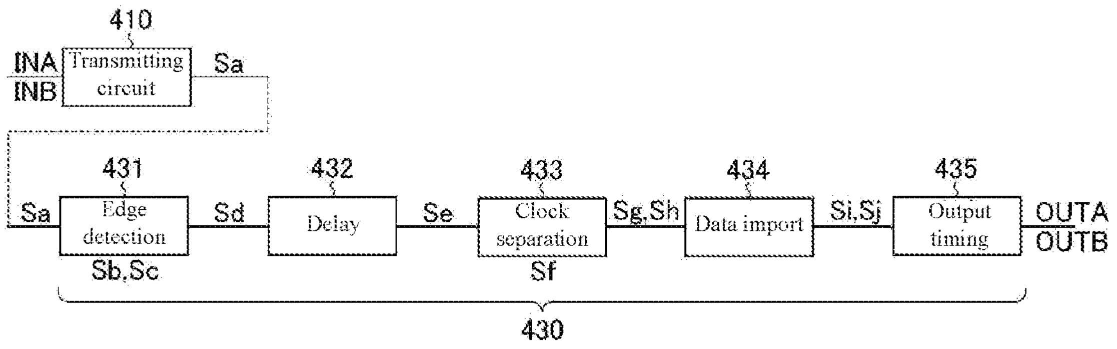
FIG. 17 is a diagram of a configuration example of a receiving circuit.

FIG. 17 shows a diagram of a configuration example of the receiving circuit 430. The receiving circuit 430 of this configuration example includes an edge detection unit 431, a delay unit 432, a clock separation unit 433, a data import unit 434 and an output timing adjustment unit 435.

The edge detection circuit 431 receives a reception pulse signal Sa transmitted from the transmitting circuit 410 via the insulated transmission path 421 (or 422). Moreover, the reception pulse signal Sa is equivalent to the reception pulse signal S32X (or S32Y) described above. The edge detection unit 431 detects the pulse edge of the switching timing flag STF included in the pulse signal Sa, and generates an edge detection signal Sd. Moreover, the edge detection nit 431 internally generates an inverted reception signal Sb and a delayed reception pulse signal Sc (with associated details to be described shortly) while generating the edge detection signal Sd.

The delay unit 432 generates a delayed edge detection signal Se by applying a predetermined delay to the edge detection signal Sd.

The clock separation unit 433 separates the delayed edge detection signal Se into a plurality of clock signals Sg and Sh. Moreover, the clock separation unit 433 internally generates a clock separation signal Sf (with associated details to be described shortly) while generating the clock signals Sg and Sh.

The data import unit 434 imports data included in the reception pulse signal Sa (equivalent to a mixed data string) into either one of separated pulse signals Si and Sj (equivalent to separated data strings) in synchronization with the clock signals Sg and Sh.

The output timing adjustment unit 435 adjusts each of the output timings of the separated pulse signals Si and Sj (equivalent to separated data strings) in synchronization with the clock signals Sg and Sh to generate the output pulse signals OUTA and OUTB (equivalent to output data strings).

Figure 18:
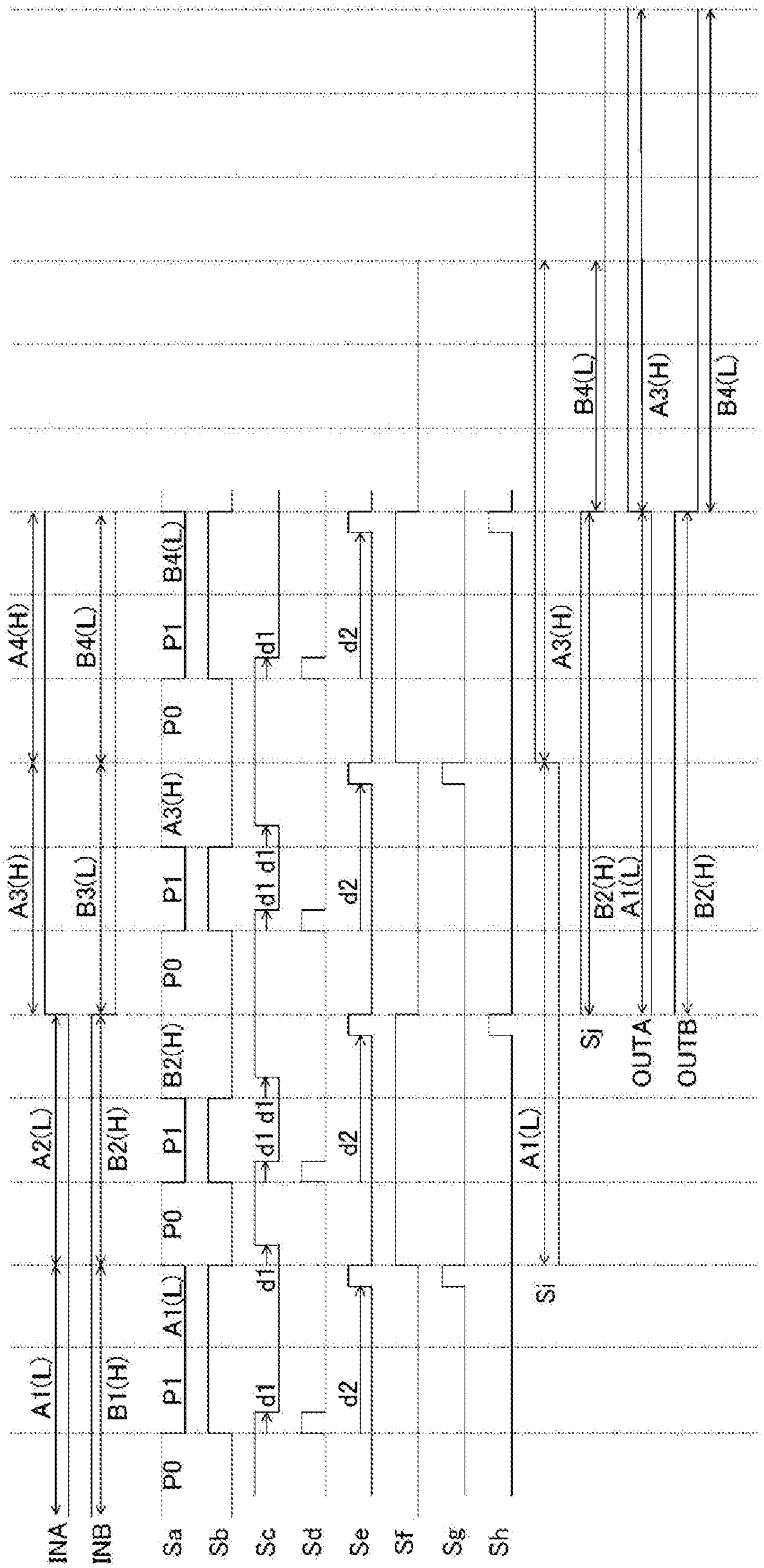
FIG. 18 is a diagram of an example of a signal transmission operation.

FIG. 18 shows a diagram of an example of a signal transmission operation in the receiving circuit 430. In this drawing, the input pulse signals INA and INB, the reception pulse signal Sa, the inverted reception pulse signal Sb, the delayed reception pulse signal Sc, the edge detection signal Sd, the delayed edge detection signal Se, the clock separation signal Sf, the clock signals Sg and Sh, the separated pulse signals Si and Sj, and the output pulse signals OUTA and OUTB are sequentially depicted from top to bottom.

Moreover, in this drawing, a case where the output pulse signals OUTA and OUTB are restored according to the data string A1B2A3B4 by assuming that the mixed data string B1A2B3A4 is damaged or lost due to a malfunction of the insulated transmission path 422 is depicted.

The input pulse signal INA includes the input data string A1A2A3A4. The data A1 and A2 are both at a low level. The data A3 and A4 are both at a high level.

The input pulse signal INB includes the input data string B1B2B3B4. The data B1 and B2 are both at a high level. The data B3 and B4 are both at a low level.

The reception pulse signal Sa includes the mixed data string A1B2A3B4 sequentially mixed with the data A1 and A3 of the input pulse signal INA and the data B2 and B4 of the input pulse signal INB. That is to say, the reception pulse signal Sa is equivalent to the reception pulse signal S32X (FIG. 14 and FIG. 15) of the first channel. Moreover, the header of each of the data A1, B2, A3 and B4 is added with the flag pulses P0 and P1 (equivalent to the timing flags STF).

The inverted reception pulse signal Sb is a signal obtained by inverting the logic level of the reception pulse signal Sa. Thus, the inverted reception pulse signal Sb is at a low level when the reception pulse signal Sa is at a high level, and is at a high level when the reception pulse signal Sa is at a low level.

The delayed reception pulse signal Sc is a signal obtained by applying a predetermined delay d1 to the reception pulse signal Sa. Thus, after the reception pulse signal Sa rises from a low level to a high level, the delayed reception pulse signal Sc rises from a low level to a high level at a timing after the delay d1 has elapsed. Moreover, after the reception pulse signal Sa drops from a high level to a low level, the delayed reception pulse signal Sc drops from a high level to a low level at a timing after the delay d1 has elapsed.

The edge detection signal Sd is a logical product signal of the inverted reception pulse signal Sb and the delayed reception pulse signal Sc. Thus, the edge detection signal Sd is at a low level when at least one between the inverted reception pulse signal Sb and the delayed reception pulse signal Sc is at a low level. Moreover, the edge detection signal Sd is at a high level when both of the inverted reception pulse signal Sb and the delayed reception pulse signal Sc are at a high level. As a result, the edge detection signal Sd becomes a pulse signal which rises to a high level at switching timings of the flag pulses P0 and P1 (equivalent to a generation timing of a falling edge).

The delayed edge detection signal Se is a signal obtained by applying a predetermined delay d2 to the edge detection signal Sd. Thus, after the edge detection signal Sd rises from a low level to a high level, the delayed edge detection signal Se rises from a low level to a high level at a timing after the delay d2 has elapsed. Moreover, after the edge detection signal Sd drops from a high level to a low level, the delayed edge detection signal Se drops from a high level to a low level at a timing after the delay d2 has elapsed.

The clock separation signal Sf is a signal of which a logic level is inverted and triggered by a pulse edge of the delayed edge detection signal Se (in this drawing, a falling edge from a high level to a low level). Thus, the clock separation signal Sf switches to a high level when the pulse edge of the delayed edge detection signal Se arrives while the clock separation signal Sf is at a low level. Moreover, the clock separation signal Sf switches to a low level when the pulse edge of the delayed edge detection signal Se arrives while the clock separation signal Sf is at a high level.

The clock signal Sg is a logical product signal of a logical inversion signal of the clock separation signal Sf and the delayed edge detection signal Se. Thus, the delayed edge detection signal Se is transmitted as the clock signal Sg when the clock separation signal Sf is at a low level, while the clock signal Sg is fixed at a low level when the clock separation signal Sf is at a high level. That is to say, among the plurality of pulses generated by the delayed edge detection signal Se, pulses generated during a low level period of the clock separation signal Sf are distributed as pulses of the clock signal Sg.

The clock signal Sh is a logical product signal of a logical product signal of the clock separation signal Sf and the delayed edge detection signal Se. Thus, the delayed edge detection signal Se is transmitted as the clock signal Sh when the clock separation signal Sf is at a high level, while the clock signal Sh is fixed at a low level when the clock separation signal Sf is at a low level. That is to say, among the plurality of pulses generated by the delayed edge detection signal Se, pulses generated during a high level period of the clock separation signal Sf are distributed as pulses of the clock signal Sh.

When the separation clock signal Si is generated, by using a pulse of the clock signal Sg is a trigger, the first data A1 and the third data A3 are sequentially latched from the reception pulse signal Sa (equivalent to the mixed data string A1B2A3B4) of the first channel.

When the separation clock signal Sj is generated, by using a pulse of the clock signal Sh is a trigger, the second data B2 and the fourth data B4 are sequentially latched from the reception pulse signal Sa (equivalent to the mixed data string A1B2A3B4) of the first channel.

The output pulse signals OUTA and OUTB are adjusted signals so that the respective output timings of the separated pulse signals Si and Sj are consistent. As a result, in the receiving circuit 430, although part of the data is lost, the output pulse signals OUTA and OUTB can still be restored. According to the illustration of this drawing, as the output pulse signal OUTA of the first channel, the data string A1(A1)A3(A3)) is output. Moreover, as the output pulse signal OUTB of the second channel, the data string B2(B2) B4(B4) is output.

<Switching Timing Flag (Second Example)>

Figure 19:
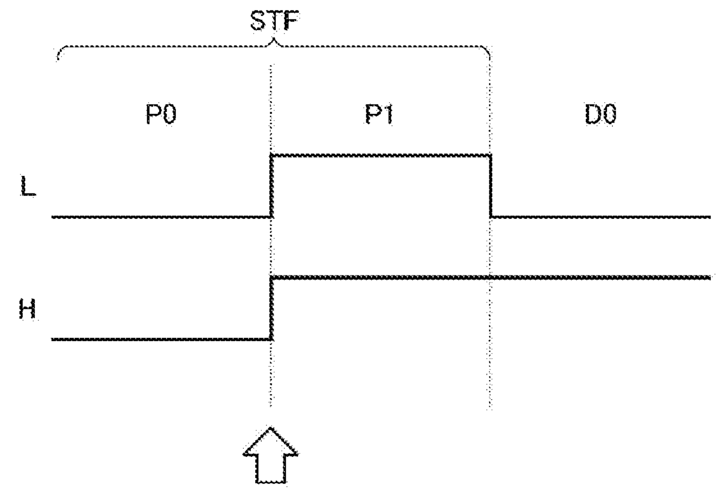
FIG. 19 is a diagram of a second example of a switching timing flag.

FIG. 19 shows a diagram of a second example of the switching timing flag STF. In the switching timing flag STF of the second example, different form the first example (FIG. 16), the flag pulse P0 is at a low level and the pulse flag P1 is at a high level. As such, the switching timing flag STF can include a pulse edge from a low level to a high level (a rising edge).

<Variation Example of Flag Adding Operation>

Figure 20:
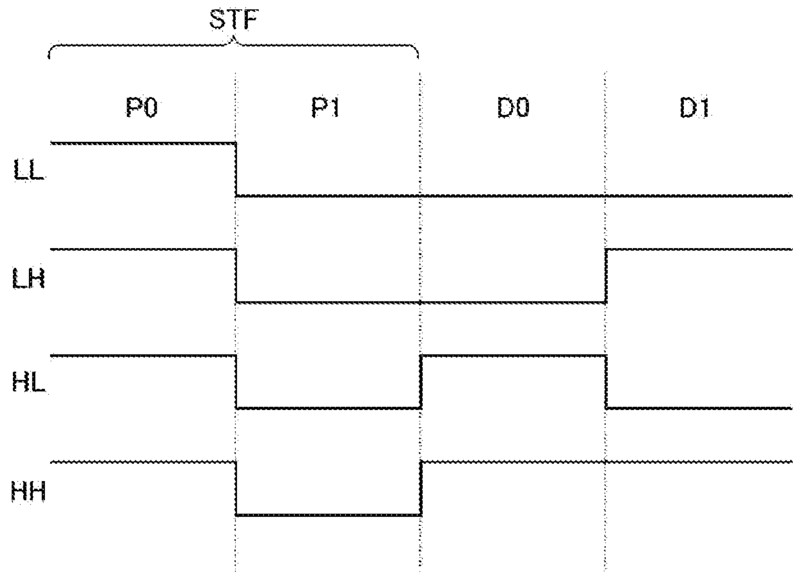
FIG. 20 is a diagram of a variation example of a flag adding operation.

FIG. 20 shows a diagram of a variation example of a flag adding operation. In the flag adding operation above (FIG. 16 and FIG. 19), a two-bit switching timing flag STF is added to the one-bit data D0. On the other hand, in this variation example, a two-bit switching timing flag STF is added to the two-bit data D0 and D1.

For example, as shown by the upper part of this drawing, when the data D0 and D1 are both at a low level, transmission is performed in a continuous manner of the flag pulse P0 at a high level, the flag pulse P1 at a low level, the data D0 at a low level and the data D1 at a low level.

Moreover, as shown by the second part of this drawing, when the data D0 is at a low level and the data D1 is at a high level, transmission is performed in a continuous manner of the flag pulse P0 at a high level, the flag pulse P1 at a low level, the data D0 at a low level and the data D1 at a high level.

Moreover, as shown by the third part of this drawing, when the data D0 is at a high level and the data D1 is at a low level, transmission is performed in a continuous manner of the flag pulse P0 at a high level, the flag pulse P1 at a low level, the data D0 at a high level and the data D1 at a low level.

Moreover, as shown by the lower part of this drawing, when the data D0 and D1 are both at a high level, transmission is performed in a continuous manner of the flag pulse P0 at a high level, the flag pulse P1 at a low level, the data D0 at a high level and the data D1 at a high level.

As such, the data added with the switching timing flag STF can also be in multiple bits. This variation example can prevent degradation in transmission efficiency caused by the switching timing flag STF added.

For example, as in the flag adding operation above (FIG. 16 and FIG. 19), a case where the two-bit switching timing flag STF added to the one-bit data D0 is taken into consideration. In this case, if the pulse cycle (equivalent to a pulse width) of each of the data 0 and the flag pulses P0 and P1 is the same, compared to a case where no switching timing flag STF is added, the transmission efficiency is reduced to ⅓. On the other hand, with regard to this variation example, the transmission efficiency is only reduced to ½. Thus, relatively speaking, the transmission efficiency is improved.

<Switching Timing Flag (Third Example)>

Figure 21:
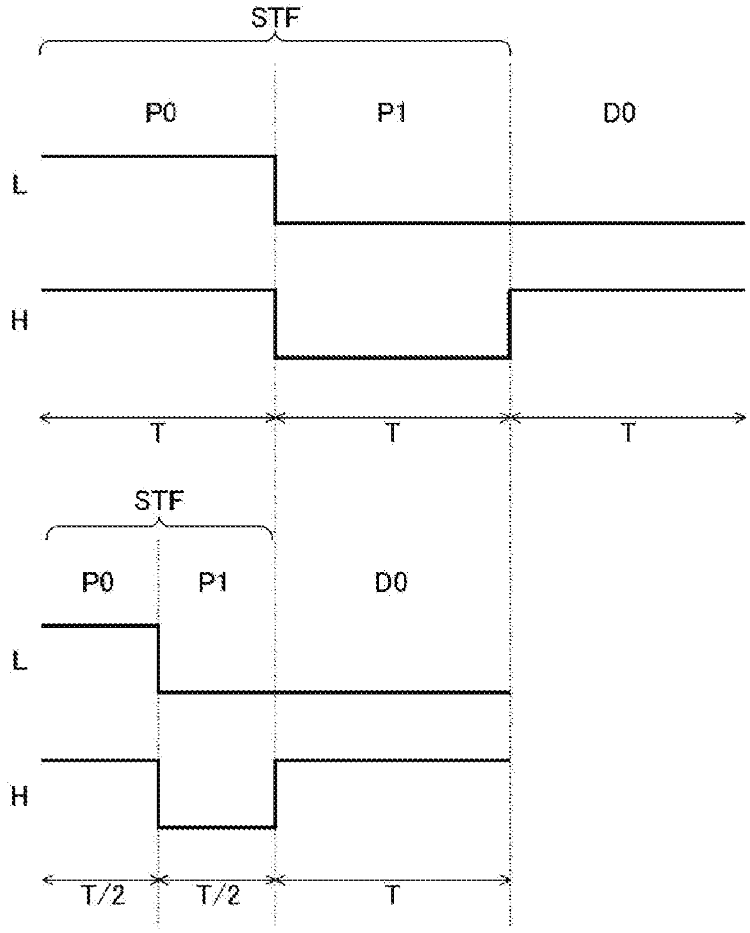
FIG. 21 is a diagram of a third example of a switching timing flag.

FIG. 21 shows a diagram of a third example of the switching timing flag STF. As shown by the upper part of this drawing, in the first example (FIG. 16) and the second example (FIG. 19) described above, a case where the pulse cycle (equivalent to a pulse width) of each of the data 0 and the flag pulses P0 and P1 is the same is depicted.

On the other hand, as shown by the lower part of this drawing, the flat pulses P0 and P1 can also have cycles shorter than that of the data D0. With such switching timing flag STF, degradation in transmission efficiency caused by the switching timing flag STF added can be prevented.

For example, in a case where the pulse cycle (equivalent to a pulse width) of each of the data 0 and the flag pulses P0 and P1 is the same, as described above, the transmission efficiency is reduced to ⅓ compared to a case where no switching timing flag STF is added. On the other hand, in a case where the pulse cycle of each of the flag pulses P0 and P1 is a half of a pulse cycle T of the data D0 (T/2), the transmission efficiency is only reduced to ½. Thus, relatively speaking, the transmission efficiency is improved.

Variation Example

Moreover, in this embodiment, a case where the number of transmission channels of the signal transmission device 400 is two is shown as an example, the number of transmission channels can be three or more. Degradation of the transmission efficiency can be further suppressed as the number of transmission channels increases.

For example, in a case where a series of data included in each of the input pulse signals INA and INB is distributed to three insulated transmission paths and mixed data strings are generated, the transmission efficiency caused by the switching timing flag STF added is reduced to ⅔. Moreover, if the number of transmission channels is four, the transmission efficiency is reduced to ¾; if the number of transmission channels is five, the transmission efficiency is reduced to ⅘.

Moreover, the embodiment can be applied in a manner irrelevant to the type (coils, capacitors and optical components) of the insulated transmission path 420.

<Note>

A summary of the various embodiments of the above description is given in the note below.

For example, a signal transmission device disclosed in the present application is configured as (a first configuration), comprising:

a transmitting circuit, configured to generate a plurality of mixed data strings from a plurality of input data strings;

a plurality of insulated transmission paths, configured for insulation transmission of the plurality of mixed data strings; and a receiving circuit, configured to restore a plurality of output data strings corresponding to the plurality of input data strings from the plurality of mixed data strings that are insulated and transmitted via the plurality of insulated transmission paths.

The signal transmission device of the first configuration can also be configured as (a second configuration), wherein the transmitting circuit is configured to generate the plurality of mixed data strings by sequentially switching data included in each of the plurality of input data strings and outputted to one of the plurality of insulated transmission paths.

The signal transmission device of the second configuration can also be configured as (a third configuration), wherein the transmitting circuit is configured to add a switching timing flag to each of the data when generating the plurality of mixed data strings, and the receiving circuit is configured to restore the plurality of output data strings according to the switching timing flag.

The signal transmission device of the third configuration can also be configured as (a fourth configuration), wherein the switching timing flag includes a pulse edge from a high level to a low level or from a low level to a high level.

The signal transmission device of the fourth configuration can also be configured as (a fifth configuration), wherein the receiving circuit includes:

an edge detection unit, configured to detect the pulse edge of the switching timing flag and generate an edge detection signal;

a delay unit, configured to generate a delayed edge detection signal by applying a delay to the edge detection signal;

a clock separation unit, configured to separate the delayed edge detection signal into a plurality of clock signals;

a data import unit, configured to import data included in the plurality of mixed data strings into one of a plurality of separated data strings in synchronization with the plurality of clock signals; and an output timing adjustment unit, configured to adjust an output timing of each of the plurality of separated data strings in synchronization with the plurality of clock signals to generate the plurality of output data strings.

The signal transmission device of any one of the third to fifth configurations can also be configured as (a sixth configuration), wherein the switching timing flag has a shorter cycle than a cycle of the data.

The signal transmission device according to any one of the first to sixth configurations can also be configured as (a seventh configuration), wherein the data is one bit or multiple bits.

The signal transmission device according to any one of the first to seventh configurations can also be configured as (an eighth configuration), wherein each of the plurality of insulated transmission paths includes a coil, a capacitor or an optical component as an insulated transmission element.

Moreover, for example, an industrial apparatus disclosed in the present application is configured as (a ninth configuration), including the signal transmission device of any one of the first to eighth configurations.

Moreover, for example, a vehicle disclosed in the present application is configured as (a tenth configuration), including the signal transmission device of any one of the first to eighth configurations.

OTHER

Further, in addition to the embodiments, various modifications may be made to the technical features disclosed by the present disclosure without departing from the scope of the technical inventive subject thereof. That is to say, all aspect described in the embodiments are illustrative rather than restrictive. Moreover, it is to be understood that the technical scope of the present disclosure is to be defined in accordance with the appended claims, and encompasses all equivalent meanings covered by the scope and all modifications made within the scope of the appended claims.

The invention claimed is:

1. A signal transmission device, comprising:

a transmitting circuit configured to generate a plurality of mixed data strings from a plurality of input data strings;

a plurality of insulated transmission paths configured for insulation transmission of the plurality of mixed data strings; and a receiving circuit configured to restore a plurality of output data strings corresponding to the plurality of input data strings from the plurality of mixed data strings that are insulated and transmitted via the plurality of insulated transmission paths.

2. The signal transmission device of claim 1, wherein the transmitting circuit is configured to generate the plurality of mixed data strings by sequentially switching data included in each of the plurality of input data strings and outputted to one of the plurality of insulated transmission paths.

3. The signal transmission device of claim 2, wherein the transmitting circuit is configured to add a switching timing flag to each of the input data strings when generating the plurality of mixed data strings, and the receiving circuit is configured to restore the plurality of output data strings according to the switching timing flag.

4. The signal transmission device of claim 3, wherein the switching timing flag includes a pulse edge from a high level to a low level or from a low level to a high level.

5. The signal transmission device of claim 4, wherein the receiving circuit includes:

an edge detection unit configured to detect the pulse edge of the switching timing flag and generate an edge detection signal;

a delay unit configured to generate a delayed edge detection signal by applying a delay to the edge detection signal;

a clock separation unit configured to separate the delayed edge detection signal into a plurality of clock signals;

a data import unit configured to import data included in the plurality of mixed data strings into one of a plurality of separated data strings in synchronization with the plurality of clock signals; and an output timing adjustment unit configured to adjust an output timing of each of the plurality of separated data strings in synchronization with the plurality of clock signals to generate the plurality of output data strings.

6. The signal transmission device of claim 3, wherein the switching timing flag has a shorter cycle than a cycle of the input data strings.

7. The signal transmission device of claim 1, wherein the input data strings are one bit or multiple bits.

8. The signal transmission device of claim 1, wherein each of the plurality of insulated transmission paths includes a coil, a capacitor or an optical component as an insulated transmission element.

9. An industrial apparatus, including the signal transmission device of claim 1.

10. A vehicle, including the signal transmission device of claim 1.

* * * * *